United States Patent

Mihara et al.

(10) Patent No.: US 8,941,926 B2
(45) Date of Patent: Jan. 27, 2015

(54) ZOOM LENS, IMAGE PICKUP APPARATUS USING THE SAME, IMAGE TRANSMISSION APPARATUS, AND IMAGE TRANSMISSION SYSTEM

(71) Applicant: Olympus Corporation, Tokyo (JP)

(72) Inventors: Shinichi Mihara, Tokyo (JP); Ryu Ota, Tokyo (JP)

(73) Assignee: Olympus Corporation, Tokyo (JP)

( * ) Notice: Subject to any disclaimer, the term of this patent is extended or adjusted under 35 U.S.C. 154(b) by 190 days.

(21) Appl. No.: 13/627,275

(22) Filed: Sep. 26, 2012

(65) Prior Publication Data

US 2013/0258130 A1 Oct. 3, 2013

(30) Foreign Application Priority Data

Sep. 30, 2011 (JP) .................. 2011-216097
Jul. 24, 2012 (JP) .................. 2012-163658

(51) Int. Cl.
*G02B 15/14* (2006.01)

(52) U.S. Cl.
USPC ........... 359/686; 359/683; 359/684; 359/685; 359/713; 359/740; 359/756; 359/757

(58) Field of Classification Search
USPC ............ 359/683–686, 713, 740, 756, 757
See application file for complete search history.

(56) References Cited

U.S. PATENT DOCUMENTS

2009/0103188 A1* 4/2009 Wada ....................... 359/688
2011/0317279 A1* 12/2011 Takahashi .................. 359/683

FOREIGN PATENT DOCUMENTS

| JP | 62-178917 A | 8/1987 |
| JP | 63-029718 A | 2/1988 |
| JP | 63-123009 A | 5/1988 |
| JP | 03-154014 A | 7/1991 |
| JP | 05-264902 A | 10/1993 |
| JP | 06-027375 A | 2/1994 |
| JP | 07-151967 A | 6/1995 |

\* cited by examiner

*Primary Examiner* — Evelyn A. Lester
(74) *Attorney, Agent, or Firm* — Brosemer, Kolefas & Assoc. LLC

(57) ABSTRACT

A zoom lens includes in order from an object side, a first lens group having a positive refractive power, a second lens group having a negative refractive power, a third lens group having a negative refractive power, a fourth lens group having a positive refractive power, a fifth lens group having a positive refractive power, and a last lens group having a positive refractive power. At the time of zooming from a wide angle end to a telephoto end, the second lens group and the third lens group move, and one of the fourth lens group, the fifth lens group, and the last lens group moves.

29 Claims, 21 Drawing Sheets

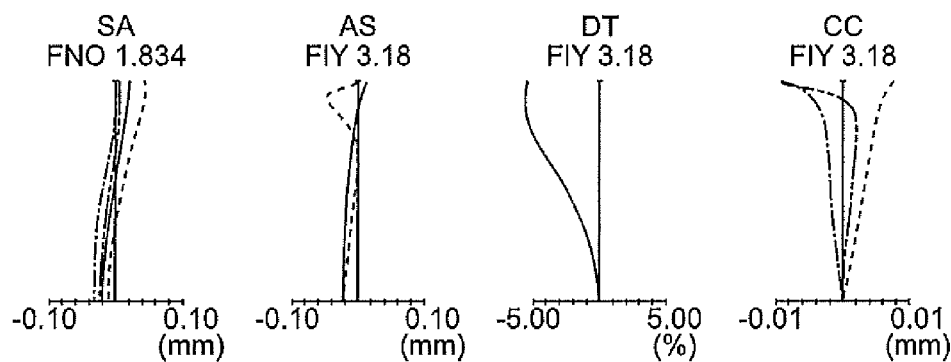
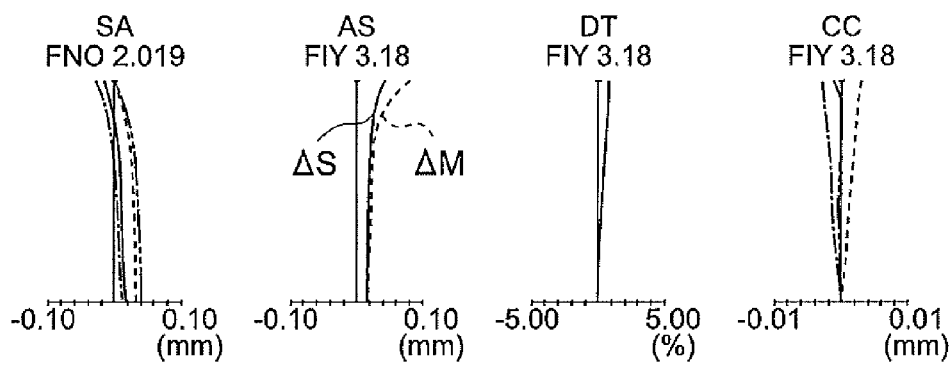
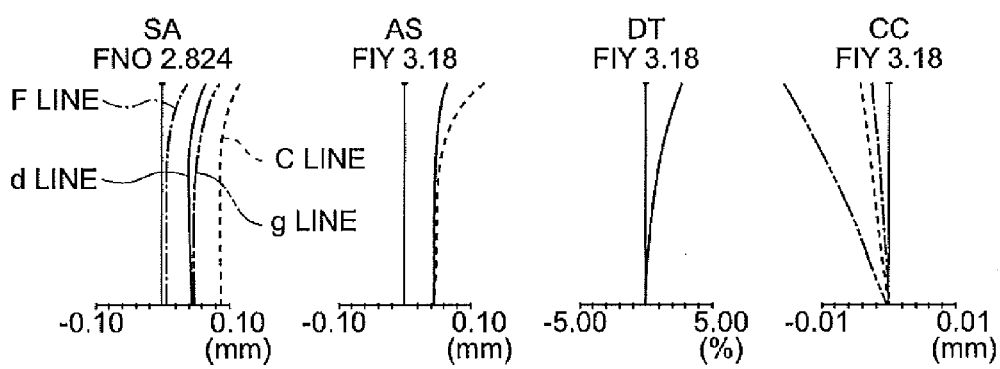

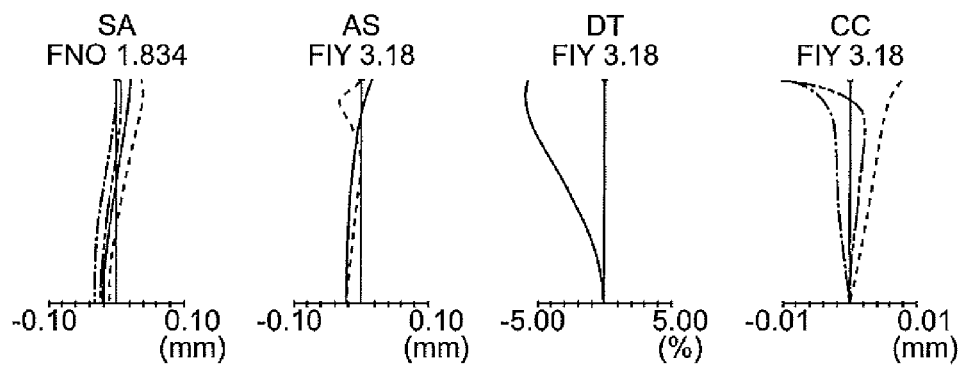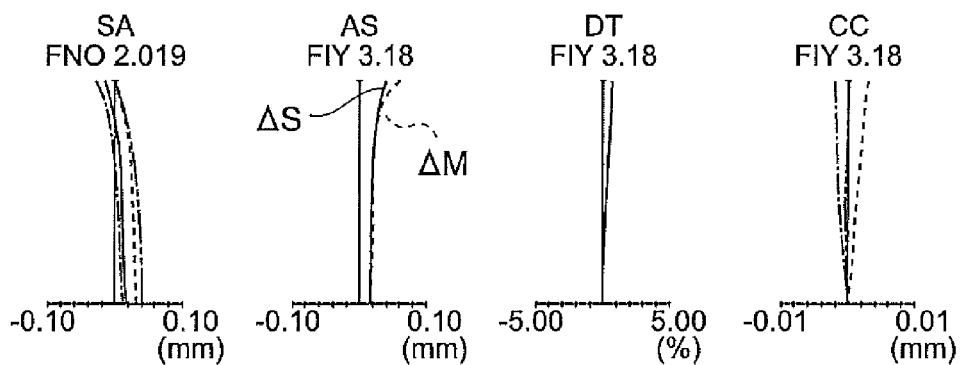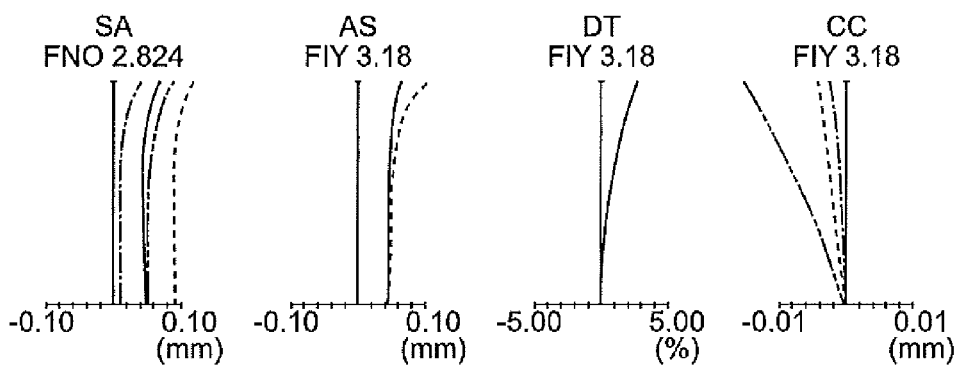

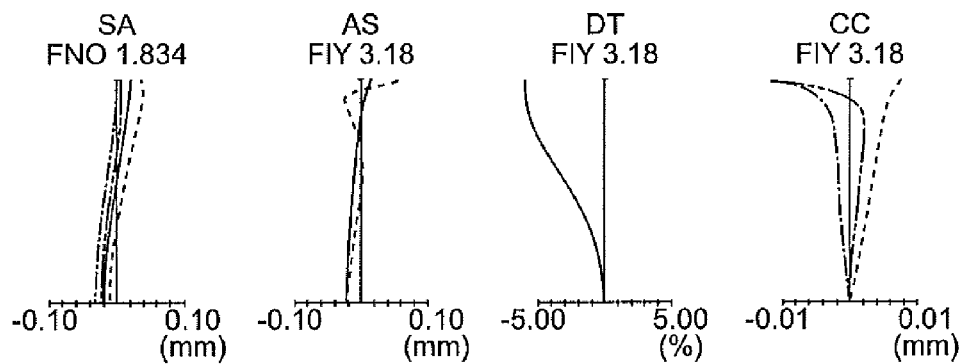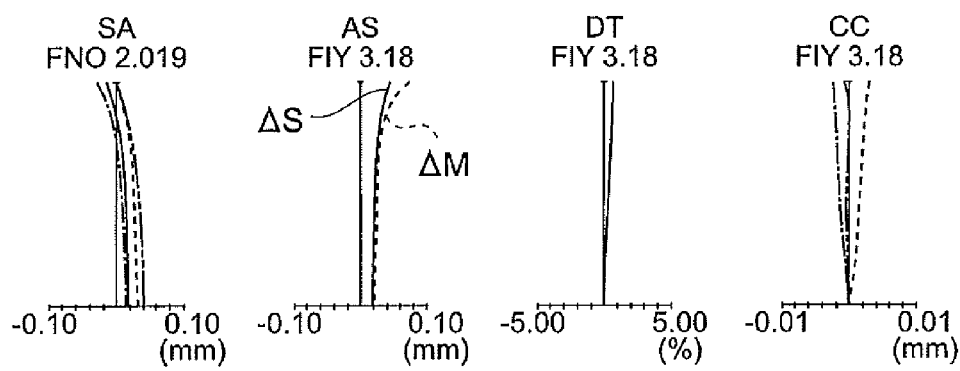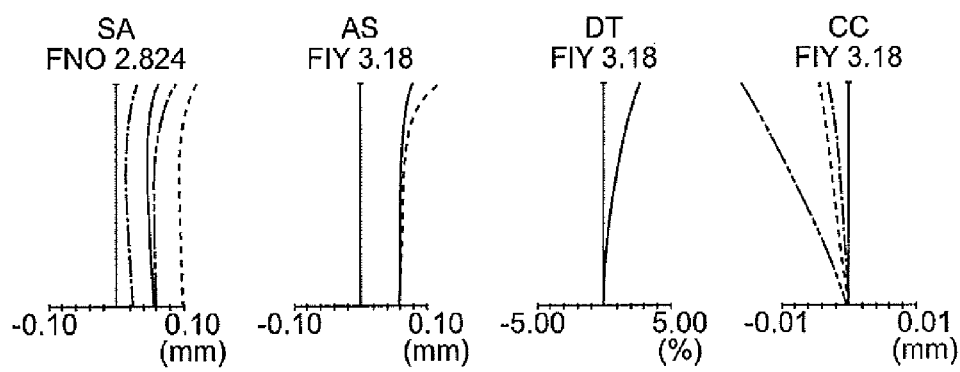

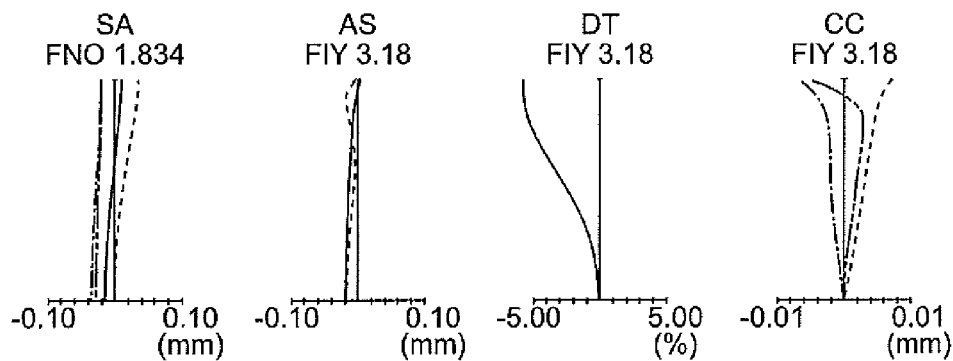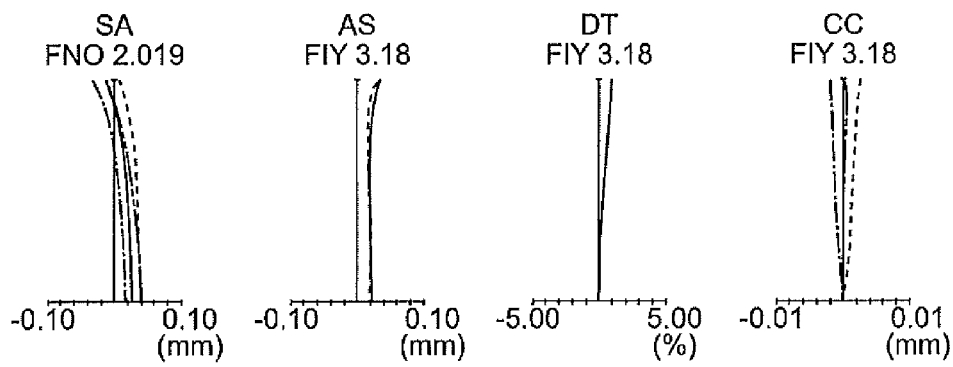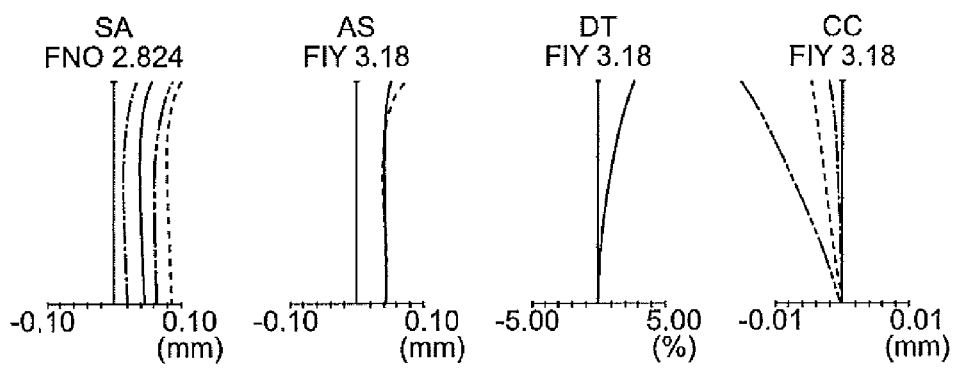

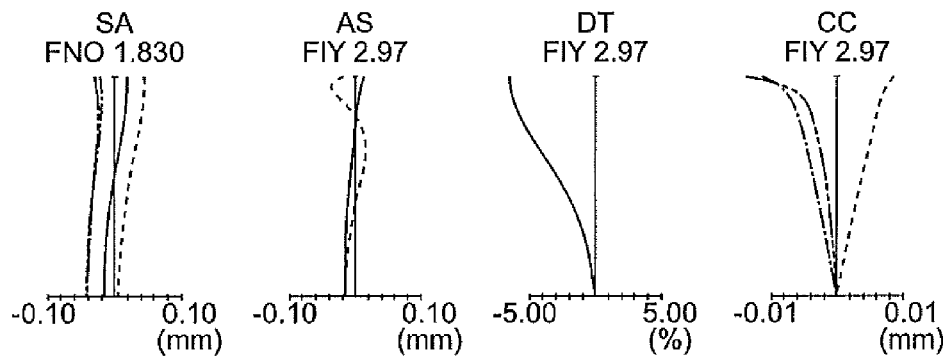
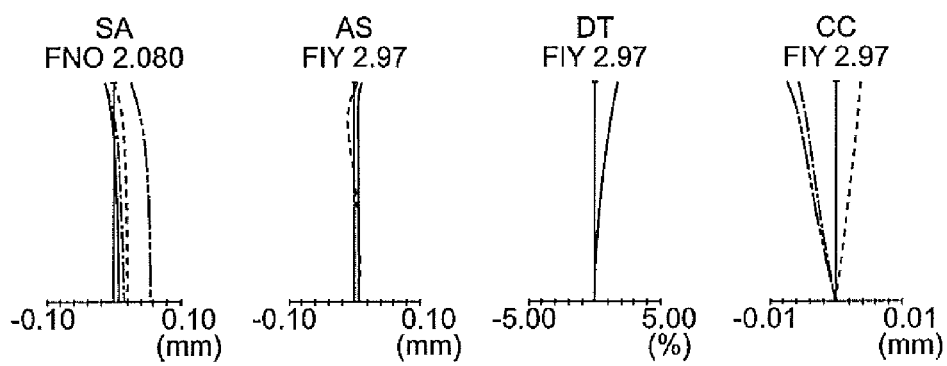
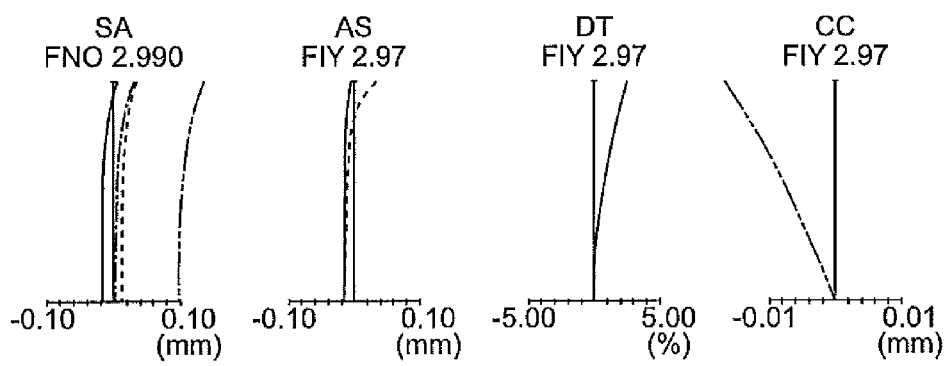

ZOOM LENS, IMAGE PICKUP APPARATUS USING THE SAME, IMAGE TRANSMISSION APPARATUS, AND IMAGE TRANSMISSION SYSTEM

CROSS-REFERENCE TO RELATED APPLICATION

The present application is based upon and claims the benefit of priority from the prior Japanese Patent Application Nos. 2011-216097 filed on Sep. 30, 2011, and 2012-163658 filed on Jul. 24, 2012; the entire contents of which are incorporated herein by reference.

BACKGROUND OF THE INVENTION

1. Field of the Invention

The present invention relates to a zoom lens, an image pickup apparatus using the same, an image transmission apparatus, and an image transmission system.

2. Description of the Related Art

In video photography, photography is carried out while zooming and focusing. In a case of carrying out always the zooming and focusing, a weight of a lens governs a focusing speed. Moreover, as an overall length of the lens changes at the time of focusing, an overall optical system and an image pickup apparatus becomes large. Moreover, a movement of center of gravity being large, the balance is not stabilized easily. Therefore, a zoom lens in which, the focusing speed is increased by moving a comparatively smaller lens, without moving a lens (group) of a front portion, and which is made compact as a whole, has been proposed.

As an example of a zoom lens in which, a first lens group is let to be fixed, a zoom lens which includes in order from an object side, a first lens group having a positive refractive power, a second lens group having a negative refractive power, a third lens group having a positive refractive power, and a fourth lens group having a positive refractive power, and in which, at the time of zooming from a wide angle end to a telephoto end, the first lens group is fixed, the second lens group is moved toward an image plane side, the third lens group is fixed, and the fourth lens group is moved, and furthermore, the focusing is carried out by moving the fourth lens group, has been proposed. (Japanese Patent Application Laid-open Publication Nos. Sho 62-178917, Sho 63-29718, and Sho 63-123009)

Furthermore, a zoom lens in which, a fifth lens group (fixed lens group) having a positive refractive power is added to an image side of the fourth lens group has also been proposed. (Japanese Patent Application Laid-open Publication No. Hei 3-154014, Hei 5-264902, Hei 6-27375, and Hei 7-151967).

SUMMARY OF THE INVENTION

A zoom lens according to the present invention, includes in order from an object side
 a first lens group having a positive refractive power,
 a second lens group having a negative refractive power,
 a third lens group having a negative refractive power,
 a fourth lens group having a positive refractive power,
 a fifth lens group having a positive refractive power, and
 a last lens group having a positive refractive power, and
 at the time of zooming from a wide angle end to a telephoto end, the second lens group and the third lens group move, and one of the fourth lens group, the fifth lens group, and the last lens group moves.

An image pickup apparatus according to the present invention includes
 the zoom lens, and
 an image pickup element which is disposed on an image plane of the zoom lens.

Moreover, an image transmission apparatus according to the present invention includes
 a camera unit which includes the image pickup apparatus,
 a main unit which carries out signal processing of an image which has been acquired by the image pickup apparatus, and
 a transmission section which transmits an image which has been subjected to processing by the main unit.

Furthermore, an image transmission system according to the present invention includes
 the image transmission apparatus, and
 the image transmission apparatus is connected to a network, and transmits an image which has been acquired at least by the image pickup apparatus, between bases which are remotely-placed physically.

BRIEF DESCRIPTION OF THE DRAWINGS

FIG. 1A is a cross-sectional view at a wide angle end, FIG. 1B is a cross-sectional view in an intermediate state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams at the time of infinite object point focusing of the image pickup optical system according to the first embodiment, where, FIG. 2A, FIG. 2B, FIG. 2C, and FIG. 2D show spherical aberration (SA), astigmatism (AS), distortion (DT), and chromatic aberration of magnification (CC) at the wide angle end, FIG. 2E, FIG. 2F, FIG. 2G, and FIG. 2H show spherical aberration (SA), astigmatism (AS), distortion (DT), and chromatic aberration of magnification (CC) in the intermediate state, and FIG. 2I, FIG. 2J, FIG. 2K, and FIG. 2L show spherical aberration (SA), astigmatism (AS), distortion (DT), and chromatic aberration of magnification (CC) at the telephoto end;

FIG. 3A is a cross-sectional view at a wide angle end, FIG. 3B is a cross-sectional view in an intermediate state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the image pickup optical system according to the second embodiment, where, FIG. 4A, FIG. 4B, FIG. 4C, and FIG. 4D show spherical aberration (SA), astigmatism (AS), distortion (DT), and chromatic aberration of magnification (CC) at the wide angle end, FIG. 4E, FIG. 4F, FIG. 4G, and FIG. 4H show spherical aberration (SA), astigmatism (AS), distortion (DT), and chromatic aberration of magnification (CC) in the intermediate state, and FIG. 4I, FIG. 4J, FIG. 4K, and FIG. 4L show spherical aberration (SA), astigmatism (AS), distortion (DT), and chromatic aberration of magnification (CC) at the telephoto end;

FIG. 5A is a cross-sectional view at a wide angle end, FIG. 5B is a cross-sectional view in an intermediate state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the image pickup optical system according to the third embodiment, where, FIG. 6A, FIG. 6B, FIG. 6C, and FIG. 6D show spherical aberration (SA), astigmatism (AS), distortion (DT), and chromatic aberration of magnification (CC) at the wide angle end, FIG. 6E, FIG. 6F, FIG. 6G, and FIG. 6H show spherical aberration (SA), astigmatism (AS), distortion (DT), and chromatic aberration of magnification (CC) in the intermediate state, and FIG. 6I, FIG. 6J, FIG. 6K, and FIG. 6L show spherical aberration (SA), astigmatism (AS), distortion (DT), and chromatic aberration of magnification (CC) at the telephoto end;

FIG. 7A is a cross-sectional view at a wide angle end, FIG. 7B is a cross-sectional view in an intermediate state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the image pickup optical system according to the fourth embodiment, where, FIG. 8A, FIG. 8B, FIG. 8C, and FIG. 8D show spherical aberration (SA), astigmatism (AS), distortion (DT), and chromatic aberration of magnification (CC) at the wide angle end, FIG. 8E, FIG. 8F, FIG. 8G, and FIG. 8H show spherical aberration (SA), astigmatism (AS), distortion (DT), and chromatic aberration of magnification (CC) in the intermediate state, and FIG. 8I, FIG. 8J, FIG. 8K, and FIG. 8L show spherical aberration (SA), astigmatism (AS), distortion (DT), and chromatic aberration of magnification (CC) at the telephoto end;

FIG. 9A is a cross-sectional view at a wide angle end, FIG. 9B is a cross-sectional view in an intermediate state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the image pickup optical system according to the fifth embodiment, where, FIG. 10A, FIG. 10B, FIG. 10C, and FIG. 10D show spherical aberration (SA), astigmatism (AS), distortion (DT), and chromatic aberration of magnification (CC) at the wide angle end, FIG. 10E, FIG. 10F, FIG. 10G, and FIG. 10H show spherical aberration (SA), astigmatism (AS), distortion (DT), and chromatic aberration of magnification (CC) in the intermediate state, and FIG. 10I, FIG. 10J, FIG. 10K, and FIG. 10L show spherical aberration (SA), astigmatism (AS), distortion (DT), and chromatic aberration of magnification (CC) at the telephoto end;

FIG. 17A is a front view of a mobile telephone 400, FIG. 17B is a side view of the mobile telephone 400, and FIG. 17C is a cross-sectional view of a photographic optical system 405;

DETAILED DESCRIPTION OF THE PREFERRED EMBODIMENTS

Figure 1A:
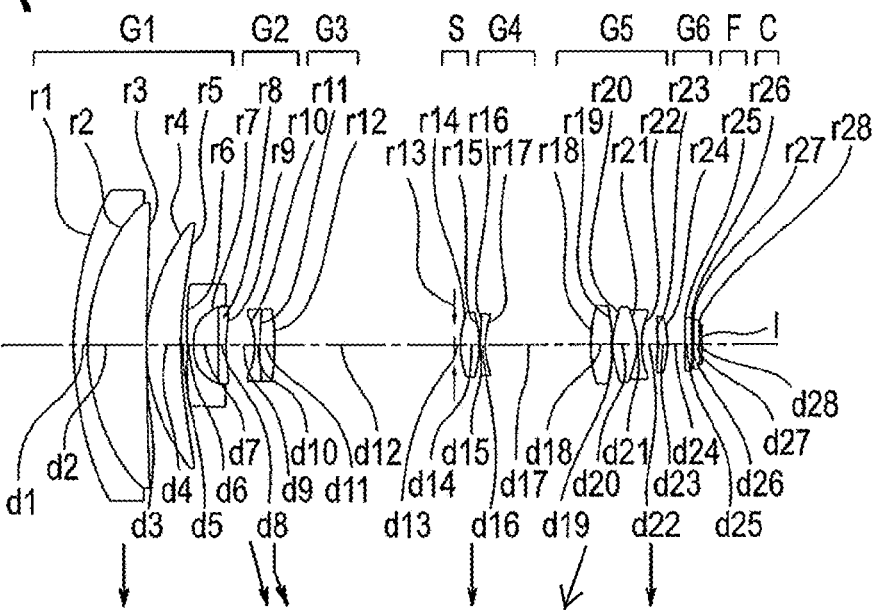
FIG. 1A, FIG. 1B, and FIG. 1C are cross-sectional views along an optical axis showing an optical arrangement at the time of infinite object point focusing of an image pickup optical system according to a first embodiment of the present invention, where.

A zoom lens according to embodiments of the present invention will be described below. In the following description, a lens for which a paraxial focal length is a positive value is let to be a positive lens, and a lens for which a paraxial focal length is a negative value is let to be a negative lens.

The zoom lens according to the embodiment includes in order from an object side, a first lens group having a positive refractive power, a second lens group having a negative refractive power, a third lens group having a negative refractive power, a fourth lens group having a positive refractive power, a fifth lens group having a positive refractive power, and a last lens group having a positive refractive power, and at the time of zooming from a wide angle end to a telephoto end, the second lens group and the third lens group move, and one of the fourth lens group, the fifth lens group, and the last lens group moves.

In the zoom lens according to the embodiment, the zoom lens includes at least six lens groups. In an optical system with a high zooming and a wide angle, when an attempt is made to suppress a fluctuation of a curvature of a meridional image surface to be small, as a side-effect thereof, an amount of fixed residual aberration including other aberrations becomes large. For correcting the amount of residual aberration, in the zoom lens according to the embodiments, three positive lens groups, or in other words, the fourth lens group, the fifth lens group, and the last lens group are disposed at a rear side of the optical system.

In the fourth lens group from among the three positive lens groups, mainly a spherical aberration and a comatic aberration are corrected. Moreover, in the fifth lens group, mainly the spherical aberration, the comatic aberration, a curvature of field, and an astigmatism are corrected. Furthermore, in the last lens group, mainly the comatic aberration, the astigmatism, and a distortion are corrected. In such manner, in the zoom lens according to the embodiments, different roles of correcting different aberrations are assigned to each of the three positive lens groups. Particularly, correction of off-axis aberration is assigned to the fifth lens group and the last lens group.

Moreover, at the time of zooming from the wide angle end to the telephoto end, the second lens group and the third lens groups are moved. By making such an arrangement, weight reduction of the movable lens groups is realized. Furthermore, even in a case of an optical system with a high zooming and a wide angle, for realizing an optical performance in which, the oblique aberration is corrected favorably, it is necessary to suppress the fluctuation of the curvature of the meridional image surface to be small at the time of zooming. For suppressing the fluctuation, it is preferable to move still another lens group apart from the second lens group and the third lens group. Particularly, by moving the fifth lens group, it is possible to correct the aberration favorably.

Moreover, in the zoom lens according to the embodiment, at the time of zooming from the wide angle end to the telephoto end, it is preferable that the first lens group is fixed, both the second lens group and the third lens group move relatively while changing a distance in between, the fourth lens group is fixed, the fixed lens group moves, and at the time of focusing the fifth lens group moves.

In the zoom lens according to the embodiment, the first lens group and the fourth lens group are fixed at the time of zooming, at the time of correcting a focal position, as well as at the time of focusing. Accordingly, the number of movable lens groups is minimized. Moreover, by moving the second lens group and the third lens group relatively while changing the distance in between, a zoom lens system having a stabilized performance with a small variation in an off-axis performance over a region from the wide angle end to an intermediate region (intermediate state). A range by which the distance between the second lens group and the third lens group changes is a part of a range from the wide angle end up to the intermediate region, or an entire range from the wide angle end up to the intermediate region. Moreover, by moving the fifth lens group, a role of focusing and focal-position correction at the time of zooming is assigned to the fifth lens group. Furthermore, the last lens group, similarly as the first lens group and the fourth lens group, may be let to be fixed at the time of zooming, at the time of focal-position correction, as well as at the time of focusing.

In the zoom lens according to the embodiments, it is preferable that the distance between the second lens group and the third lens group decreases at the time of zooming from the wide angle end to the intermediate region, and that the distance between the second lens group and the third lens group is constant at the time of zooming from the intermediate region to the telephoto end.

By making such an arrangement, it is possible to have an enhanced effect of increase in magnification in a combined system of the second lens group and the third lens group with a wide angle of view at the wide angle end and in a state of the oblique aberration from the intermediate region up to the telephoto end corrected favorably. As a result, it is possible to improve a zooming efficiency in the overall zoom lens system. A range by which the distance between the second lens group and the third lens group changes is a part of a range from the wide angle end to the intermediate region, or the entire distance from the wide angle end up to the intermediate region.

In the zoom lens according to the embodiments, it is preferable that the zoom lens satisfies the following conditional expression (1).

$$0.5 < (fg3/fg2) < 1.3 \quad (1)$$

where, fg2 denotes an amount of movement of the second lens group from the wide angle end to the telephoto end, and fg3 denotes an amount of movement of the third lens group from the wide angle end to the telephoto end.

By the zoom lens satisfying conditional expression (1), it is possible to realize a zoom lens with a wide angle of view at the wide angle end, and a high zoom ratio.

When an upper limit value of conditional expression (1) is surpassed, it becomes difficult to locate an entrance-pupil position at the wide angle end at the object side. As a result, since the angle of view at the wide angle end becomes small, it becomes difficult to make high a zooming (increase in magnification) ratio as the overall zoom lens system. Whereas, when a lower limit value of conditional expression (1) is not reached, correction of the comatic aberration and of the curvature of the meridional image surface is susceptible to be difficult.

Here, it is more preferable that the zoom lens satisfies the following conditional expression (1') instead of conditional expression (1).

$$0.7 < (fg3/fg2) < 1.2 \quad (1')$$

Moreover, it is even more preferable that the zoom lens satisfies the following conditional expression (1") instead of conditional expression (1).

$$0.9 < (fg3/fg2) < 1.1 \quad (1'')$$

In the zoom lens according to the embodiments, it is preferable that the zoom lens satisfied the following conditional expressions (2) and (3).

$$0.35 < (\beta 45T/\beta 45W)/(\beta 23T/\beta 23W) < 1.2 \quad (2)$$

$$3.0 < \beta 23T/\beta 23W < fT/fW \quad (3)$$

where, $\beta 23W$ denotes a magnification of a combined system of the second lens group and the third lens group, at the wide angle end, $\beta 23T$ denotes a magnification of the combined system of the second lens group and the third lens group, at the telephoto end, $\beta 45W$ denotes a magnification of a combined system of the fourth lens group and the fifth lens group, at the wide angle end, $\beta 45T$ denotes a magnification of the combined system of the fourth lens group and the fifth lens group, at the telephoto end, fW denotes a focal length of an overall zoom lens system, at the wide angle end, fT denotes a focal length of the overall zoom lens system at the telephoto end, where, $fT/fW > 7$, and each is a focal length or a magnification at the time of infinite object point focusing.

By the zoom lens satisfying conditional expressions (2) and (3), it is possible to realize a zoom lens system with a small F value at the wide angle end, a wide angle of view, and a high zooming ratio.

Conditional expression (2) is an expression in which, a proportion of a zooming (increase in magnification) ratio of the combined system of the fourth lens group and the fifth lens group with respect to the zooming (increase in magnification) ratio of the second lens group and the third lens group from the wide angle end up to the telephoto end is regulated. By the zoom lens satisfying conditional expression (2), it is possible to widen the angle of view as well as to make high the zoom ratio, in a state of the oblique aberration corrected favorably.

When an upper limit value of conditional expression (2) is surpassed, it becomes difficult to secure a space for the fifth lens group to move for focusing, at the telephoto end. Here, when an attempt is made to secure the space for moving forcedly, a correction of fluctuation of various aberrations by shortening the overall length, and focusing becomes difficult. Whereas, when a lower limit value of conditional expression (2) is not reached, when the angle of view is increased gradually beyond a diagonal angle of field of 75 degrees for example, it becomes difficult to make small a lens diameter of the first lens group, and to correct the oblique aberration favorably.

Conditional expression (3) is an expression in which, a proportion of a combined magnification at the wide angle end of the second lens group and the third lens group, and a combined magnification at the telephoto end of the second lens group and the third lens group is regulated. By the zoom lens satisfying conditional expression (3), it is possible to have a high zoom ratio upon suppressing an occurrence of aberration in the second lens group and the third lens group.

When an upper limit value of conditional expression (3) is surpassed, the zooming ratio of the second lens group and the third lens group becomes large. In such case, at the wide angle end, the oblique aberration, particularly, the astigmatism, the distortion and the chromatic aberration of magnification, is susceptible to be degraded. Moreover, at the telephoto end, the spherical aberration, the comatic aberration, and a longitudinal chromatic aberration are susceptible to be degraded. Whereas, when a lower limit value of conditional expression (3) is not reached, since the zooming ration of the second lens group and the third lens group becomes small, it becomes difficult to achieve a high zoom ratio (such as a zoom ratio beyond ten times).

Here, it is more preferable that the zoom lens system satisfies the following conditional expression (2') instead of conditional expression (2).

$$0.45 < (\beta 45T/\beta 45W)/(\beta 23T/\beta 23W) < 1.2 \quad (2')$$

Moreover, it is even more preferable that the zoom lens satisfies the following conditional expression (2") instead of conditional expression (2).

$$0.50 < (\beta 45T/\beta 45W)/(\beta 23T/\beta 23W) < 1.2 \quad (2")$$

Here, it is more preferable that the zoom lens satisfies the following conditional expression (3') instead of conditional expression (3).

$$3.6 < \beta 23T/\beta 23W < 0.8 fT/fW \quad (3')$$

Moreover, it is even more preferable that the zoom lens satisfied the following conditional expression (3") instead of conditional expression (3).

$$3.9 < \beta 23T/\beta 23W < 0.7 fT/fW \quad (3")$$

It is preferable that $\beta 45T/\beta 45W$ is 1.8 or more, and 2.1 or more is even more preferable, and 2.4 or more is all the more preferable. Moreover, it is preferable that the zoom ratio $\gamma$ (=fT/fW) is 9 or more, and 10 or more is more preferable.

In the zoom lens according to the embodiments, it is preferable that the zoom lens satisfies the following conditional expression (4).

$$0.1 < |\beta 23W| < 0.30 \quad (4)$$

where, $\beta 23W$ denotes a combined magnification of the second lens group and the third lens group, at the wide angle end, and is a magnification at the time of infinite object point focusing.

Conditional expression (4) is an expression in which, a combined magnification (at the time of infinite object point focusing) of the second lens group and the third lens group at the wide angle end is regulated. When the combined magnification of the second lens group and the third lens group at the wide angle end is let to be a small value, a focal length of the first lens group becomes long and therefore, correction of oblique aberration at the wide angle end, and an aberration overall from a longitudinal up to oblique at the telephoto end becomes easy. Whereas, when the combined magnification at the wide angle end of the second lens group and the third lens group is made further smaller gradually, and to zero in an extreme case, or in other words, a state in which the first lens group has no refractive power, a zooming effect is ceased in the second lens group and the third lens group (in other words, the zoom lens becomes a negative-lead type zoom lens). As the zooming effect is ceased in the second lens group and the third lens group, it becomes difficult to secure a high zooming ratio. Therefore, it is not preferable to let the combined magnification at the wide angle end of the second lens group and the third lens group to be excessively small. Therefore, by the zoom lens satisfying conditional expression (4), it is possible to achieve a high zoom ratio in a state of the oblique aberration corrected favorably.

When an upper limit value of conditional expression (4) is surpassed, correction of the oblique aberration in particular, when the angle of view is widened, becomes difficult. Whereas, when a lower limit value of conditional expression (4) is not reached, securing of a high zoom ratio becomes difficult.

Here, it is more preferable that the zoom lens satisfies the following conditional expression (4') instead of conditional expression (4).

$$0.1 < |\beta 23W| < 0.24 \quad (4')$$

Moreover, it is even more preferable that the zoom lens satisfies the following conditional expression (4") instead of conditional expression (4).

$$0.1 < |\beta 23W| < 0.22 \quad (4")$$

In the zoom lens according to the embodiments, it is preferable that the zoom lens satisfies the following conditional expression (5).

$$0.7 < |\beta 23T| < 2.0 \quad (5)$$

where, $\beta 23T$ denotes a combined magnification of the second lens group and the third lens group, at the telephoto end, and is a magnification at the time of infinite object point focusing.

Conditional expression (5) is an expression in which, a combined magnification (at the time of infinite object point focusing) of the second lens group and the third lens group at the telephoto end is regulated. It is preferable to make an arrangement such that the combined magnification (at the time of infinite object time focusing) of the second lens group and the third lens group at the telephoto end does not exceed |−1| substantially, or in other words, to make an arrangement such that the zoom lens satisfies conditional expression (5).

When such an arrangement is made, it is possible to make high the zooming ratio (increase in magnification) by the combined system of the fourth lens group and the fifth lens group.

When an upper limit of conditional expression (5) is surpassed, the zooming ratio of the combined system of the fourth lens group and the fifth lens group becomes small. As a result, it becomes difficult to achieve a high zoom ratio. Whereas, when a lower limit value of conditional expression (5) is not reached, the zooming ratio of the combined system of the second lens group and the third lens group becomes small. In such case, there is a need to further increase the zooming ratio of the combined system of the fourth lens group and the fifth lens group. As the zooming ratio of the combined system of the fourth lens group and the fifth lens group is increased further, at the telephoto end, it becomes difficult to secure a space for the fifth lens group to move for focusing. Here, when an attempt is made to secure the space for movement of the fifth lens group forcedly, shortening of the overall length and correction of fluctuation of various aberrations by focusing becomes difficult.

An image point P by the combined system of the second lens group and the third lens group becomes an object point for the combined system of the fourth lens group and the fifth lens group. With approaching to a telephoto side, as the magnification of the combined system of the second lens group and the third lens group exceeds |−1| substantially, or in other words, as the zoom lens cannot satisfy conditional expression (5), the image point P moves toward the object side. Therefore, the magnification (at the time of infinite object point focusing) of the combined system of the fourth lens group and the fifth lens group becomes small.

Here, it is more preferable that the zoom lens satisfies the following conditional expression (5') instead of conditional expression (5).

$$0.7<|\beta 23T|<1.4 \tag{5'}$$

Moreover, it is even more preferable that the zoom lens satisfies the following conditional expression (5") instead of conditional expression (5).

$$0.7<|\beta 23T|<1.2 \tag{5"}$$

In the zoom lens according to the embodiments, it is preferable that the zoom lens satisfies the following conditional expression (6).

$$1.10<f45W/f45T<2.00 \tag{6}$$

where, f45W denotes a focal length of a combined system of the fourth lens group and the fifth lens group, at the wide angle end, f45T denotes a focal length of the combined system of the fourth lens group and the fifth lens group, at the telephoto end, and each of f45W and f45T is a magnification at the time of infinite object point focusing.

Conditional expression (6) is an expression in which, a ratio of a focal length at the wide angle end of the combined system of the fourth lens group and the fifth lens group and a focal length at the telephoto end of the combined system of the fourth lens group and the fifth lens group is regulated. By the zoom lens satisfying conditional expression (6), at the time of zooming from the wide angle end toward the telephoto end, it is possible to maintain or to shorten a focal length of the combined system. As a result, since it is possible to make high the zooming (increase in magnification) ratio by the combined system of the fourth lens group and the fifth lens group, it is possible to make the zoom ratio of the overall zoom lens system high.

When an upper limit value of conditional expression (6) is surpassed, since a relative decentering sensitivity of the fourth lens group and the fifth lens group becomes high, the spherical aberration and the comatic aberration in particular, are degraded. Therefore, degradation of image forming performance is susceptible. Whereas, when a lower limit value of conditional expression (6) is not reached, even when an amount of movement of the fifth lens group is increased, it is difficult to make high the zooming (increase in magnification) ratio by the combined system of the fourth lens group and the fifth lens group.

Here, it is more preferable that the zoom lens satisfies the following conditional expression (6') instead of conditional expression (6).

$$1.20<f45W/f45T<2.00 \tag{6'}$$

Moreover, it is even more preferable that the zoom lens satisfies the following conditional expression (6") instead of conditional expression (6).

$$1.25<f45W/f45T<2.00 \tag{6"}$$

In the zoom lens according to the embodiments, it is preferable that the zoom lens satisfies the following conditional expression (7).

$$0.30<|\beta 45W|<0.70 \tag{7}$$

where,

β45W denotes a magnification of a combined system of the fourth lens group and the fifth lens group, at the wide angle end, and is a magnification at the time of infinite object point focusing.

Conditional expression (7) is an expression which regulates a magnification of the combined system of the fourth lens group and the fifth lens group at the wide angle end. By the zoom lens satisfying conditional expression (7), widening of the angle of view and slimming of the zoom lens are possible.

When an upper limit value of conditional expression (7) is surpassed, it is necessary to shorten a focal length of the first lens group. When the focal length of the first lens group is shortened, the widening of the angle of view becomes difficult. Whereas, when a lower limit value of conditional expression (7) is not reached, the fifth lens group and a lens group on the image side adjacent to the fifth lens group are susceptible to interfere. When a distance between the fifth lens group and the lens group on the image side adjacent to the fifth lens group is widened, the overall length of the optical system becomes long.

Here, it is more preferable that the zoom lens satisfies the following conditional expression (7') instead of conditional expression (7).

$$0.37<|\beta 45W|<0.56 \tag{7'}$$

It is even more preferable that the zoom lens satisfies the following conditional expression (7") instead of conditional expression (7).

$$0.39<|\beta 45W|<0.53 \tag{7"}$$

In the zoom lens according to the embodiments, it is preferable that the zoom lens satisfies the following conditional expression (8).

$$0.90<|\beta 45T|<1.80 \tag{8}$$

where,

β45T denotes a magnification of a combined system of the fourth lens group and the fifth lens group, at the telephoto end, and is a magnification at the time of infinite object point focusing.

Conditional expression (8) is an expression which regulates a magnification of the combined system of the fourth lens group and the fifth lens group at the telephoto end. By the zoom lens satisfying conditional expression (8), widening of the angle of view and slimming of the zoom lens are possible.

When an upper limit value of conditional expression (8) is surpassed, an F value at the telephoto end is susceptible to become large. Whereas, when a lower limit value of conditional expression (8) is not reached, a combined magnification β23W (at the time of infinite object point focusing) of the second lens group and the third lens group at the wide angle end becomes excessively small. Therefore, it is difficult to make the zooming (increase in magnification) ratio as the overall zoom lens system high.

Here, it is more preferable that the zoom lens satisfies the following conditional expression (8') instead of conditional expression (8).

$$1.00 < |\beta 45T| < 1.35 \tag{8'}$$

Moreover, it is even more preferable that the zoom lens satisfies the following conditional expression (8") instead of conditional expression (8).

$$1.04 < |\beta 45T| < 1.28 \tag{8"}$$

In the zoom lens according to the embodiments, it is preferable that a direction of movement of the fifth lens group at the time of zooming is toward the object side all the time.

When such an arrangement is made, an effect of increase in magnification in the combined system of the fourth lens group and the fifth lens group is enhanced. Accordingly, it is possible to improve a magnification efficiency in the overall zoom lens system. Particularly, an effect is exerted at the time of carrying out zooming further toward the telephoto side while maintaining a focused state to the object. An order of focusing and zooming may be arbitrary and focusing and zooming may be carried out simultaneously or in parallel.

In the zoom lens according to the embodiments, it is preferable that the fifth lens group includes in order form the object side, a lens component having a positive refractive power and a lens component having a negative refractive power.

By making such an arrangement, it is possible to locate a principal-point position of the fifth lens group on the object side. Accordingly, at the telephoto end at which, an amount of drawing is the maximum, it is possible to keep a distance with the fourth lens group to be substantially widened in advance. As a result, it is possible to carry out focusing to an object at a closer distance by drawing the fifth lens group toward the object side. The lens component is one of a single lens and a cemented lens, and has two optical surfaces which are in contact with air.

In the zoom lens according to the embodiments, it is preferable that the zoom lens satisfies the following conditional expression (9).

$$-0.3 < (R52F - R52R)/(R52F + R52R) < 0.6 \tag{9}$$

where,

R52F denotes a paraxial radius of curvature of a surface nearest to the object side of a lens component having a negative refractive power in the fifth lens group, and R52R denotes a paraxial radius of curvature of a surface nearest to an object side of a lens component having a negative refractive power in the fifth lens group.

Conditional expression (9) is an expression which regulates a shape (indicated by a reciprocal of a shape factor) of the negative lens component in the fifth lens group. By the zoom lens satisfying conditional expression (9), it is possible to suppress an occurrence of the comatic aberration and the curvature of field.

When an upper limit value of conditional expression (9) is surpassed, correction of the comatic aberration and of the curvature of the meridional image surface is susceptible to become difficult. Whereas, when a lower limit value of conditional expression (9) is not reached, it becomes difficult to locate the principal-point position of the fifth lens group toward the object side. As a result, at the telephoto end, it becomes difficult to secure a space for the fifth lens group to move for focusing. As a result, it is difficult to shorten the overall length of the optical system.

Here, it is more preferable that the zoom lens satisfies the following conditional expression (9') instead of conditional expression (9).

$$-0.2 < (R52F - R52R)/(R52F + R52R) < 0.4 \tag{9'}$$

Moreover, it is even more preferable that the zoom lens satisfies the following conditional expression (9") instead of conditional expression (9).

$$-0.1 < (R52F - R52R)/(R52F + R52R) < 0.2 \tag{9"}$$

In the zoom lens according to the embodiments, it is preferable that a lens component having a negative refractive power in the fifth lens group is a cemented lens, and that the cemented lens includes in order from the object side, a single lens having a positive refractive power and a single lens having a negative refractive power, and that the zoom lens satisfies the following conditional expression (10).

$$-0.5 < (R522F + R522R)/(R522F - R522R) < 1.2 \tag{10}$$

where,

R522F denotes a paraxial radius of curvature of a surface on the object side of the single lens having a negative refractive power in the fifth lens group, and R522R denotes a paraxial radius of curvature of a surface on an image of the single lens having a negative refractive power in the fifth lens group.

Conditional expression (10) is an expression which regulates a shape (indicated by a reciprocal of a shape factor) of a negative lens in the cemented lens of the fifth lens group. By the zoom lens satisfying conditional expression (10), it is possible suppress an occurrence of the comatic aberration and the curvature of field.

When an upper limit value of conditional expression (10) is surpassed, correction of the comatic aberration and of the curvature of the meridional image surface becomes difficult. Whereas, when a lower limit value of conditional expression (10) is not reached, it becomes difficult to locate the principal-point position of the fifth lens group on the object side. As a result, at the telephoto end, it becomes difficult to secure a space for the fifth lens group to move for focusing. As a result, it is difficult to shorten the overall length of the optical system.

Here, it is more preferable that the zoom lens satisfies the following conditional expression (10') instead of conditional expression (10).

$$-0.2 < (R522F + R522R)/(R522F - R522R) < 0.6 \tag{10'}$$

Moreover, it is even more preferable that the zoom lens satisfies the following conditional expression (10") instead of conditional expression (10).

$$-0.1 < (R522F + R522R)/(R522F - R522R) < 0.4 \tag{10"}$$

In the zoom lens according to the embodiments, it is preferable that the fourth lens group includes in order from the object side two lens components namely, a lens component having a positive refractive power and a lens component having a negative refractive power.

When such an arrangement is made, it is possible to locate the principal-point position of the fifth lens group on the object side. As a result, it is possible to shorten the overall length of the zoom lens. The lens component is one of a single lens and a cemented lens, and has two optical surfaces which are in contact with air.

In the zoom lens according to the embodiments, it is preferable that the zoom lens satisfies the following conditional expression (11).

$$0.1 < (R42F - R42R)/(R42F + R42R) < 5.0 \qquad (11)$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

Conditional expression (11) is an expression which regulates a shape (indicated by a reciprocal of a shape factor) of the lens component having a negative refractive power in the fourth lens group. By the zoom lens satisfying conditional expression (11), it is possible to shorten the overall length of the zoom lens.

When an upper limit value of conditional expression (11) is surpassed, it is advantageous for shortening the overall length of the zoom lens, but correction of the spherical aberration and of the comatic aberration over the entire zooming area is susceptible to become difficult. When a lower limit value of conditional expression (11) is not reached, since it becomes difficult to locate the principal-point position of the fourth lens group on the object side, it becomes difficult to shorten the overall length of the zoom lens.

Here, it is more preferable that the zoom lens satisfies the following conditional expression (11') instead of conditional expression (11).

$$0.2 < (R42F - R42R)/(R42F + R42R) < 2.5 \qquad (11')$$

Moreover, it is even more preferable that the zoom lens satisfies the following conditional expression (11") instead of conditional expression (11).

$$0.4 < (R42F - R42R)/(R42F + R42R) < 1.2 \qquad (11'')$$

In the zoom lens according to the embodiments, it is preferable that the last lens group includes a lens component having a positive refractive power.

As zoom lens system, a system from the first lens group up to the fifth lens group may be a complete system. However, in the zoom lens which has a high zooming ratio and a wide angle as in the embodiments, the focal length of the first lens group is long, and a range of appropriate magnification of a zooming and focal-position correcting lens group from the second lens group up to the fifth lens group tends to be somewhat high. Therefore, for letting the focal length to be a desired focal length, a lens group which lowers the magnification as a whole is necessary. Therefore, in the zoom lens of the embodiments, the last lens group is provided to the image side of the fifth lens group, and the last lens group is let to have a positive refractive power, and is imparted a magnification of less than +1 times. The lens component is one of a single lens and a cemented lens, and has two optical surfaces which are in contact with air.

In the zoom lens according to the embodiments, it is preferable that the zoom lens satisfies the following conditional expression (12).

$$0.70 < |\beta FW| < 0.98 \qquad (12)$$

where, $\beta FW$ denotes a magnification of the last lens, at the wide angle end, and is a magnification at the time of infinite object point focusing.

Conditional expression (12) is an expression which regulates the magnification of the last lens group at the wide angle end, and is a magnification at the time of infinite object point focusing. By the zoom lens satisfying conditional expression (12), it is possible to suppress the occurrence of various oblique aberrations.

When an upper limit value of conditional expression (12) is surpassed, it becomes difficult to achieve a zoom lens having a high zoom ratio and a wide angle. Whereas, when a lower limit value of conditional expression (12) is not reached, since the refractive power of the last lens group becomes large, a height of off-axis rays passing through the last lens group is susceptible increase. As a result, correction of various oblique aberrations becomes difficult.

Here, it is more preferable that the zoom lens satisfies the following conditional expression (12') instead of conditional expression (12).

$$0.73 < |\beta FW| < 0.94 \qquad (12')$$

It is even more preferable that the zoom lens system satisfies the following conditional expression (12") instead of conditional expression (12).

$$0.76 < |\beta FW| < 0.90 \qquad (12'')$$

In the zoom lens according to the embodiments, it is preferable that the zoom lens satisfies the following conditional expression (13).

$$0.4 < f5/fF < 1.2 \qquad (13)$$

where, f5 denotes a focal length of the fifth lens group, and fF denotes a focal length of the last lens group.

Conditional expression (13) is an expression which regulates a ratio of the focal length of the fifth lens group and the focal length of the last lens group. By the zoom lens satisfying conditional expression (13), it is possible to realize a zoom lens which is slim, and which has a wide angle of view and a high zooming ratio.

When an upper limit value of conditional expression (13) is surpassed, since the focal length of the fifth lens group becomes long, an amount of movement of the fifth lens group at the time of zooming and focusing becomes large. Whereas, when a lower limit value of conditional expression (13) is not reached, since the focal length of the last lens group becomes long, widening of the angle and achieving high zoom ratio becomes difficult.

Here, it is more preferable that the zoom lens satisfies the following conditional expression (13') instead of conditional expression (13).

$$0.5 < f5/fF < 1.0 \qquad (13')$$

Moreover, it is even more preferable that the zoom lens satisfies the following conditional expression (13") instead of conditional expression (13).

$$0.6 < f5/fF < 0.95 \qquad (13'')$$

Moreover, in the zoom lens according to the embodiments, it is preferable that the zoom lens satisfies the following conditional expression (14).

$$0.40 < f5/f4 < 1.00 \quad (14)$$

where,
f4 denotes a focal length of the fourth lens group, and
f5 denotes a focal length of the fifth lens group.

Conditional expression (14) is an expression which regulates a ratio of the focal length of the fifth lens group and the focal length of the fourth lens group. By the zoom lens satisfying conditional expression (14), it is possible to realize a zoom lens which is slim, and is of a type in which, the focusing is carried out by the fifth lens group.

When an upper limit value of conditional expression (14) is surpassed, since the focal length of the fifth lens group becomes long, the amount of movement of the fifth lens group at the time of zooming and focusing becomes large. Or, since the focal length of the fourth lens group becomes short, a back focus becomes excessively short. Whereas, when a lower limit value of conditional expression (14) is not reached, the focal length of the fourth lens group becomes long. In this case, since the magnification of the fifth lens group at a telephoto side is beyond −1 or close to −1, the focusing by the fifth lens group becomes impossible.

Here, it is more preferable that the zoom lens satisfies the following conditional expression (14') instead of conditional expression (14).

$$0.65 < f5/f4 < 0.85 \quad (14')$$

Moreover, it is even more preferable that the zoom lens satisfies the following conditional expression (14") instead of conditional expression (14).

$$0.72 < f5/f4 < 0.80 \quad (14'')$$

In the zoom lens according to the embodiments, it is preferable that the zoom lens satisfies the following conditional expression (15).

$$4.0 < f5/fW < 10.0 \quad (15)$$

where,
f5 denotes a focal length of the fifth lens group, and
fW denotes a focal length of the overall zoom lens, at the wide angle end, and is a focal length at the time of infinite object point focusing.

Conditional expression (15) is an expression which regulates the focal length of the fifth lens group and the focal length of the overall lens system at the wide angle end. By the zoom lens satisfying conditional expression (15), it is possible to realize a zoom lens which is slim and in which, an occurrence of aberration due to decentering is suppressed.

When an upper limit value of conditional expression (15) is surpassed, since the focal length of the fifth lens group becomes long, the amount of movement of the fifth lens group at the time of zooming and focusing becomes large. Whereas, when a lower limit value of conditional expression (15) is not reached, a decentering sensitivity and an aberration fluctuation due to zooming are susceptible to increase. As a result, the spherical aberration and the comatic aberration in particular, are degraded.

Here, it is more preferable that the zoom lens satisfies the following conditional expression (15') instead of conditional expression (15).

$$4.8 < f5/fW < 7.0 \quad (15')$$

Moreover, it is even more preferable that the zoom lens satisfies the following conditional expression (15") instead of conditional expression (15).

$$5.1 < f5/fW < 6.0 \quad (15'')$$

In the zoom lens according to the embodiments, it is preferable that the zoom lens satisfies the following conditional expression (16).

$$-2.00 < ff5/f5 < -1.00 \quad (16)$$

where,
f5 denotes a focal length of the fifth lens group, and
ff5 denotes a distance from an apex of a surface nearest to the object side of the fifth lens group up to a front-side focal point of the fifth lens group.

Conditional expression (16) is an expression which regulates a ratio of the focal length of the fifth lens group, and a distance from the apex of the surface nearest to the object side of the fifth lens group up to the front-side focal point of the fifth lens group. By the zoom lens satisfying conditional expression (16), it is possible to make the optical system slim and to suppress an occurrence of the oblique aberration.

When an upper limit value of conditional expression (16) is surpassed, the fourth lens group and the fifth lens group are susceptible to come closer. In this case, securing of a focusing space at the telephoto end of the fifth lens group is susceptible to become difficult. Whereas, when a lower limit value of conditional expression (16) is not reached, since a height of oblique incident rays in particular, in the fifth lens group increases, correction of the oblique aberration becomes difficult.

Here, it is more preferable that the zoom lens satisfies the following conditional expression (16') instead of conditional expression (16).

$$-1.50 < ff5/f5 < -1.10 \quad (16')$$

Moreover, it is even more preferable that the zoom lens satisfies the following conditional expression (16") instead of conditional expression (16).

$$-1.35 < ff5/f5 < -1.15 \quad (16'')$$

In the zoom lens according to the embodiments, it is preferable that the zoom lens satisfies the following conditional expression (17).

$$0.50 < fb4/f4 < 1.5 \quad (17)$$

where,
f4 denotes a focal length of the fourth lens group, and
fb4 is a distance from an apex of a surface nearest to the object side of the fourth lens group up to a rear-side focal point of the fourth lens group.

Conditional expression (17) is an expression which regulates a ratio of the focal length of the fourth lens group, and the distance from the apex of the surface nearest to the object side of the fourth lens group up to the rear-side focal point of the fourth lens group. By the zoom lens satisfying conditional expression (17), it is possible to slim the zoom lens and to suppress an occurrence of the oblique aberration.

When an upper limit value of conditional expression (17) is surpassed, it is disadvantageous for shortening the overall length of the zoom lens. Whereas, when a lower limit value of conditional expression (17) is not reached, the comatic aberration is susceptible to be degraded.

Here, it is more preferable that the zoom lens satisfies the following conditional expression (17') instead of conditional expression (17).

$$0.72 < fb4/f4 < 1.1 \quad (17')$$

Moreover, it is even more preferable that the zoom lens satisfies the following conditional expression (17") instead of conditional expression (17).

$$0.82 < fb4/f4 < 1.0 \quad (17'')$$

In the zoom lens according to the embodiments, it is preferable that the zoom lens satisfies the following conditional expression (18).

$$9 < f1/fW < 18 \quad (18)$$

where, f1 denotes a focal length of the first lens group, and fW denotes a focal length of the overall zoom lens, at the wide angle end, and is a focal length at the time of infinite object point focusing.

Conditional expression (18) is an expression which regulates a ratio of the focal length of the first lens group and the focal length of the overall zoom lens at the wide angle end. By the zoom lens satisfying conditional expression (18), it is possible to achieve a high zoom ratio and to suppress an occurrence of various aberrations.

When an upper limit value of conditional expression (18) is surpassed, it is disadvantageous for achieving a high zoom ratio. Whereas, when a lower limit value of conditional expression (18) is not reached, it becomes difficult to carry out widening of the angle of view, correction of the comatic aberration and the curvature of the meridional image surface at the wide angle end, and correction of the spherical aberration and the longitudinal chromatic aberration at the telephoto end.

Here, it is more preferable that the zoom lens satisfies the following conditional expression (18') instead of conditional expression (18).

$$10.5 < f1/fW < 17 \quad (18')$$

It is even more preferable that the zoom lens satisfies the following conditional expression (18") instead of conditional expression (18).

$$11.5 < f1/fW < 16 \quad (18'')$$

In the zoom lens according to the embodiments, it is preferable that the zoom lens satisfies the following conditional expression (19).

$$-0.5 < fW/f1234T < 0.10 \quad (19)$$

where, fW denotes a focal length of the overall zoom lens at the wide angle end, and f1234T denotes a focal length of a combined system from the first lens group up to the fourth lens group, at the telephoto end, and each of fW and f12341 is a focal length at the time of infinite object point focusing.

Conditional expression (19) is an expression which regulates a ratio of the focal length of the overall zoom lens at the wide angle end, and the focal length of the combined system from the first lens group up to the fourth lens group, at the telephoto end. By the zoom lens satisfying conditional expression (19), it is possible to achieve a high zoom ratio and to suppress an occurrence of various aberrations.

When an upper limit value of conditional expression (19) is surpassed, it is disadvantageous for widening of the angle, correction of the comatic aberration and the curvature of the meridional image surface at the wide angle end, and correction of the spherical aberration and the longitudinal chromatic aberration at the telephoto end. Whereas, when a lower limit value of conditional expression (19) is not reached, it is disadvantageous for achieving a high zoom ratio.

Here, it is more preferable that the zoom lens satisfies the following conditional expression (19') instead of conditional expression (19).

$$-0.4 < fW/f1234T < 0.04 \quad (19')$$

Moreover, it is even more preferable that the zoom lens satisfies the following conditional expression (19") instead of conditional expression (19).

$$-0.3 < fW/f1234T < 0.02 \quad (19'')$$

When the last lens group is moved toward the object side at the time of zooming from the wide angle end to the telephoto end, it is advantageous as there is an action of negating fluctuation in the comatic aberration and the curvature of the meridional image surface at the time of zooming. However, when the last lens group is moved toward the object side, a sensitivity of error such as decentering tends to increase near the telephoto end in particular. When it is taken into consideration that the sensitivity of error increases by making the last lens group movable, it is preferable to keep the last lens group fixed at the time of zooming.

Moreover, an image pickup apparatus according to the embodiment includes the zoom lens described above, and an image pickup element which is disposed at an image plane of the zoom lens.

Exemplary embodiments of the image pickup optical system and the image pickup apparatus will be described below in detail while referring to the accompanying diagrams. However, the present invention is not restricted to the embodiments described below. A positive and a negative of the refractive power is based on a paraxial radius of curvature.

Figure 1B:
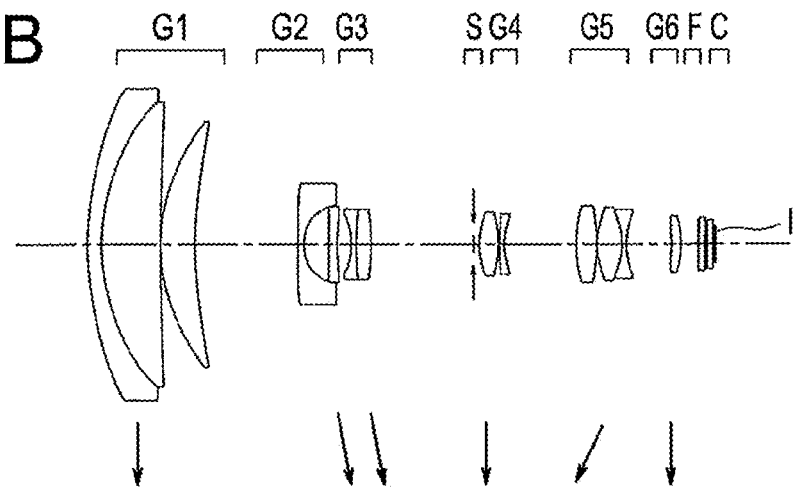
Figure 1C:
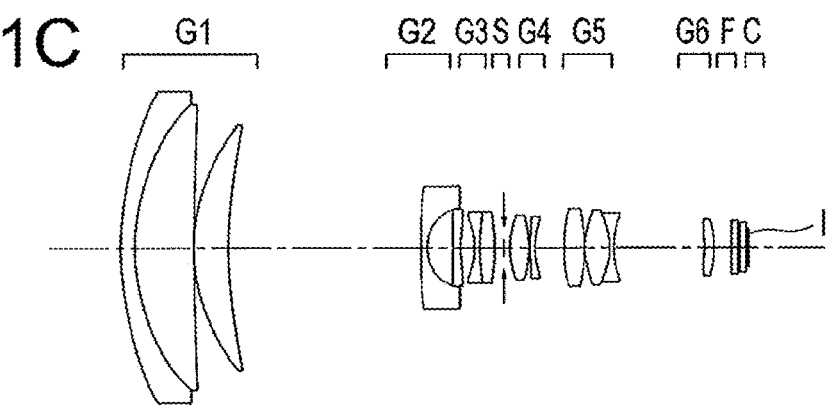

Next, an image pickup optical system according to a first embodiment of the present invention will be described below. FIG. 1A, FIG. 1B, and FIG. 1C are cross-sectional views along an optical axis showing an optical arrangement at the time of infinite object point focusing of the image pickup optical system according to the first embodiment, where, FIG. 1A is a cross-sectional view at a wide angle end, FIG. 1B is a cross-sectional view in an intermediate state, and FIG. 1C is a cross-sectional view at a telephoto end.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams at the time of infinite object point focusing of the image pickup optical system according to the first embodiment, where, FIG. 2A, FIG. 2B, FIG. 2C, and FIG. 2D show spherical aberration (SA), astigmatism (AS), distortion (DT), and chromatic aberration of magnification (CC) at the wide angle end, FIG. 2E, FIG. 2F, FIG. 2G, and FIG. 2H show spherical aberration (SA), astigmatism (AS), distortion (DT), and chromatic aberration of magnification (CC) in the intermediate state, and FIG. 2I, FIG. 2J, FIG. 2K, and FIG. 2L show spherical aberration (SA), astigmatism (AS), distortion (DT), and chromatic aberration of magnification (CC) at the telephoto end. Moreover, FIY denotes an image height. Reference numerals in the aberration diagrams are common for all the embodiments which will be described below.

The zoom lens (image pickup optical system) according to the first embodiment, as shown in FIG. 1A, FIG. 1B, and FIG. 1C, includes in order from an object side, a first lens group G1 having a positive refractive power, a second lens group G2 having a negative refractive power, a third lens group G3 having a negative refractive power, an aperture stop S, a fourth lens group G4 having a positive refractive power, a fifth lens group G5 having a positive refractive power, and a sixth lens group G6 having a positive refractive power.

At the time of zooming from the wide angle end to the telephoto end, the first lens group G1 is fixed, the second lens group G2 moves toward an image side, the fourth lens group G4 is fixed, the fifth lens group G5 moves toward the object side, and the sixth lens group G6 is fixed. Moreover, the third lens group G3 is fixed from the wide angle end up to a predetermined position, and moves together with the second lens group G2 from the predetermined position up to the telephoto end. In the first embodiment, the predetermined position is almost an intermediate position between the wide angle end and the intermediate state. Therefore, at the time of zooming, a distance between the second lens group G2 and the third lens group G3 decreases up to half way (predetermined position) from the wide angle end to the intermediate state, and thereafter, up to the telephoto end, the distance between the second lens group G2 and the third lens group G3 is constant.

The first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, and a negative meniscus lens having a convex surface directed toward the object side. The third lens group G3 includes a cemented lens of a biconcave negative lens and a biconvex positive lens. The fourth lens group G4 includes a biconvex positive lens, and a negative meniscus lens having a convex surface directed toward the object side. The fifth lens group G5 includes a biconvex positive lens, and a cemented lens of a biconvex positive lens and a biconcave negative lens. The sixth lens group G6 includes a positive meniscus lens having a concave surface directed toward the object side.

An aspheric surface is provided to a total of six surfaces namely, both surfaces of the negative meniscus lens (positioned toward the third lens group G3) having the convex surface directed toward the object side in the second lens group G2, both surfaces of the biconvex positive lens in the fourth lens group G4, and both surfaces of the positive meniscus lens having the concave surface directed toward the object side in the sixth lens group G6.

Figure 3A:
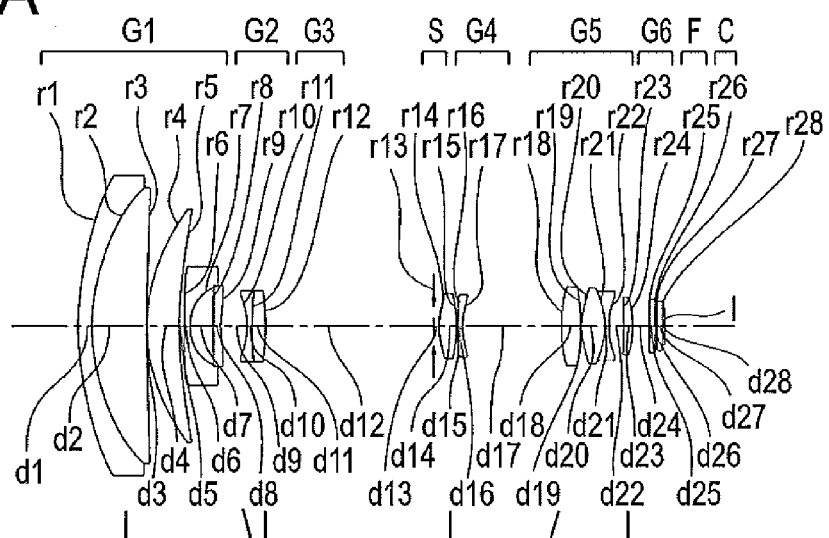
FIG. 3A, FIG. 3B, FIG. 3C are cross-sectional views along an optical axis showing an optical arrangement at the time of infinite object point focusing of an image pickup optical system according to a second embodiment of the present invention, where.
Figure 3B:
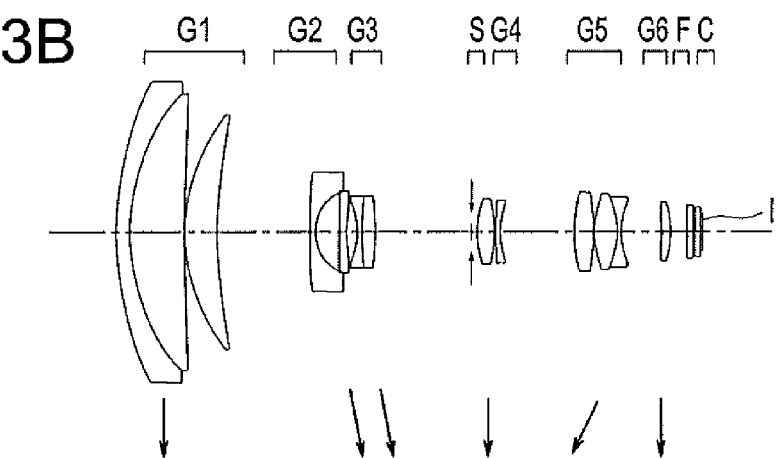
Figure 3C:
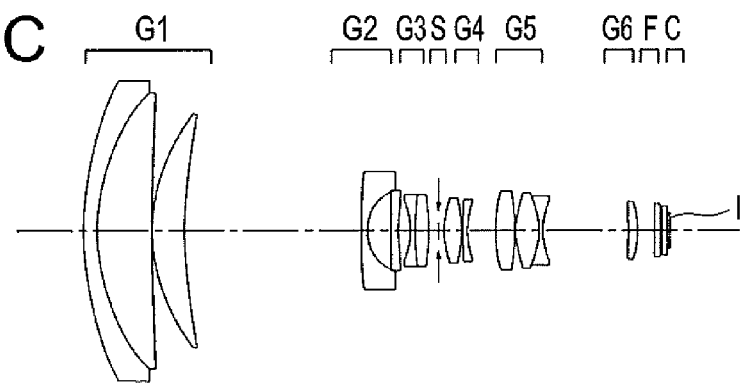

Next, an image pickup optical system according to a second embodiment of the present invention will be described below. FIG. 3A, FIG. 3B, and FIG. 3C are cross-sectional views along an optical axis showing an optical arrangement at the time of infinite object point focusing of the image pickup optical system according to the second embodiment of the present invention, where, FIG. 3A is a cross-sectional view at a wide angle end, FIG. 3B is a cross-sectional view in an intermediate state, and FIG. 3C is a cross-sectional view at a telephoto end.

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the image pickup optical system according to the second embodiment, where, FIG. 4A, FIG. 4B, FIG. 4C, and FIG. 4D show spherical aberration (SA), astigmatism (AS), distortion (DT), and chromatic aberration of magnification (CC) at the wide angle end, FIG. 4E, FIG. 4F, FIG. 4G, and FIG. 4H show spherical aberration (SA), astigmatism (AS), distortion (DT), and chromatic aberration of magnification (CC) in the intermediate state, and FIG. 4I, FIG. 4J, FIG. 4K, and FIG. 4L show spherical aberration (SA), astigmatism (AS), distortion (DT), and chromatic aberration of magnification (CC) at the telephoto end.

The zoom lens (image pickup optical system) according to the second embodiment, as shown in FIG. 3A, FIG. 3B, and FIG. 3C, includes in order from an object side, a first lens group G1 having a positive refractive power, a second lens group G2 having a negative refractive power, a third lens group G3 having a negative refractive power, an aperture stop S, a fourth lens group G4 having a positive refractive power, a fifth lens group G5 having a positive refractive power, and a sixth lens group G6 having a positive refractive power.

At the time of zooming from the wide angle end to the telephoto end, the first lens group G1 is fixed, the second lens group G2 moves toward an image side, the fourth lens group G4 is fixed, the fifth lens group G5 moves toward the object side, and the sixth lens group G6 is fixed. Moreover, the third lens group 2G3 is fixed from the wide angle end up to a predetermined position, and moves together with the second lens group G2 from the predetermined position up to the telephoto end. In the second embodiment, the predetermined position is almost an intermediate (middle) position between the wide angle end and the intermediate state. Therefore, at the time of zooming, a distance between the second lens group G2 and the third lens group G3 decreases up to half way (predetermined position) from the wide angle end to the intermediate state, and thereafter, up to the telephoto end, the distance between the second lens group G2 and the third lens group G3 is constant.

The first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, and a negative meniscus lens having a convex surface directed toward the object side. The third lens group G3 includes a cemented lens of a biconcave negative lens and a biconvex positive lens. The fourth lens group G4 includes a biconvex positive lens, and a negative meniscus lens having a convex surface directed toward the object side. The fifth lens group G5 includes a biconvex positive lens, and a cemented lens of a biconvex positive lens and a biconcave negative lens. The sixth lens group G6 includes a positive meniscus lens having a concave surface directed toward the object side.

An aspheric surface is provided to a total of six surfaces namely, both surfaces of the negative meniscus lens (positioned toward the third lens group G3) having the convex surface directed toward the object side in the second lens group G2, both surfaces of the biconvex positive lens in the fourth lens group G4, and both surfaces of the positive meniscus lens having the concave surface directed toward the object side in the sixth lens group G6.

Figure 5A:
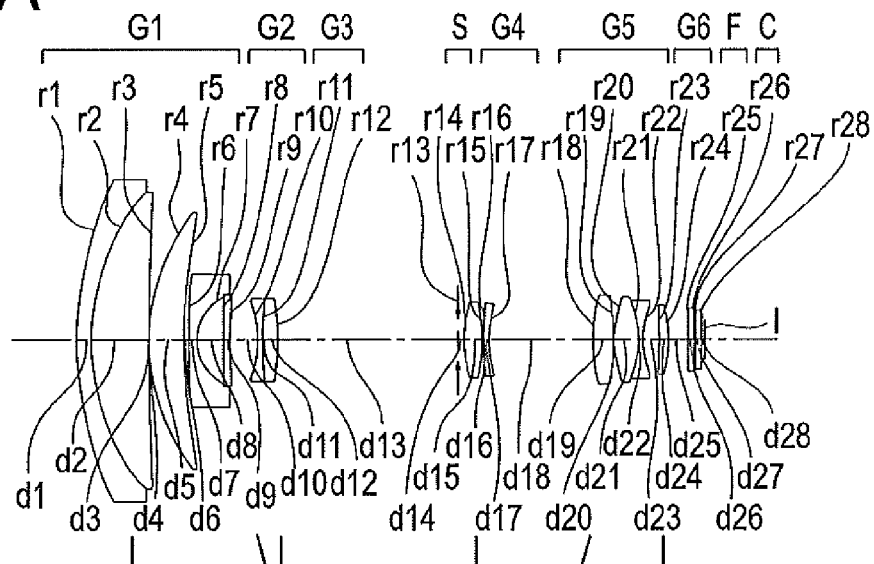
FIG. 5A, FIG. 5B, FIG. 5C are cross-sectional views along an optical axis showing an optical arrangement at the time of infinite object point focusing of an image pickup optical system according to a third embodiment of the present invention, where.
Figure 5B:
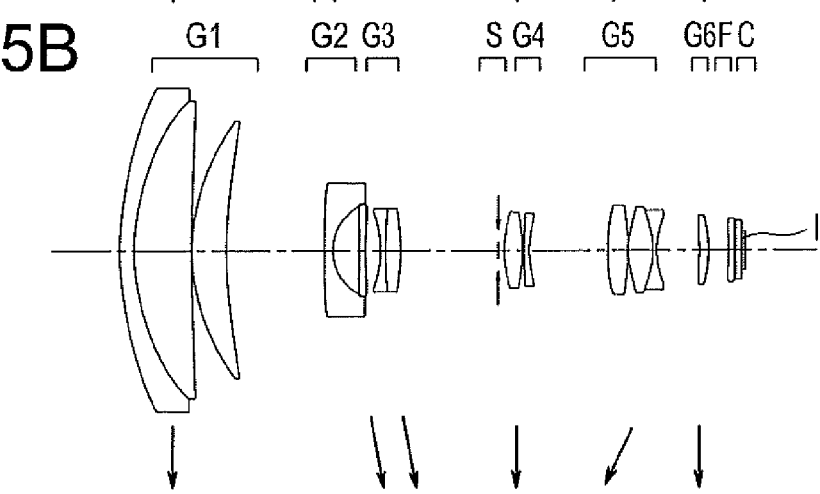
Figure 5C:
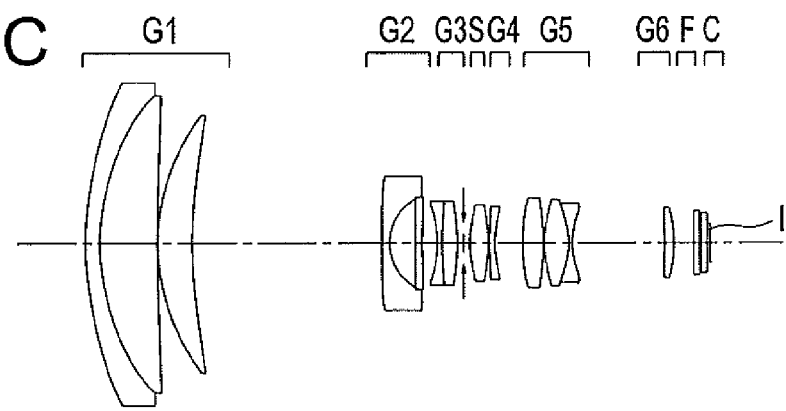

Next, an image pickup optical system according to a third embodiment of the present invention will be described below. FIG. 5A, FIG. 5B, and FIG. 5C are cross-sectional views along an optical axis showing an optical arrangement at the time of infinite object point focusing of the image pickup optical system according to the third embodiment of the present invention, where, FIG. 5A is a cross-sectional view at a wide angle end, FIG. 5B is a cross-sectional view in an intermediate state, and FIG. 5C is a cross-sectional view at a telephoto end.

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the image pickup optical system according to the third embodiment, where, FIG. 6A, FIG. 6B, FIG. 6C, and FIG. 6D show spherical aberration (SA), astigmatism (AS), distortion (DT), and chromatic aberration of magnification (CC) at the wide angle end, FIG. 6E, FIG. 6F, FIG. 6G, and FIG. 6H show spherical aberration (SA), astigmatism (AS), distortion (DT), and chromatic aberration of magnification (CC) in the intermediate state, and FIG. 6I, FIG. 6J, FIG. 6K, and FIG. 6L show spherical aberration (SA), astigmatism (AS), distortion (DT), and chromatic aberration of magnification (CC) at the telephoto end.

The zoom lens (image pickup optical system) according to the third embodiment, as shown in FIG. 5A, FIG. 5B, and FIG. 5C, includes in order from an object side, a first lens group G1 having a positive refractive power, a second lens group G2 having a negative refractive power, a third lens group G3 having a negative refractive power, an aperture stop S, a fourth lens group G4 having a positive refractive power, a fifth lens group G5 having a positive refractive power, and a sixth lens group G6 having a positive refractive power.

At the time of zooming from the wide angle end to the telephoto end, the first lens group G1 is fixed, the second lens group G2 moves toward an image side, the fourth lens group G4 is fixed, the fifth lens group G5 moves toward the object side, and the sixth lens group G6 is fixed. Moreover, the third lens group G3 is fixed from the wide angle end up to a predetermined position, and moves together with the second lens group G2 from the predetermined position up to the telephoto end. In the third embodiment, the predetermined position is almost an intermediate (middle) position between the wide angle end and the intermediate state. Therefore, at the time of zooming, a distance between the second lens group G2 and the third lens group G3 decreases up to halfway (predetermined position) from the wide angle end to the intermediate state, and thereafter, up to the telephoto end, the distance between the second lens group G2 and the third lens group G3 is constant.

The first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, and a negative meniscus lens having a convex surface directed toward the object side. The third lens group G3 includes a cemented lens of a biconcave negative lens and a biconvex positive lens. The fourth lens group G4 includes a biconvex positive lens, and a negative meniscus lens having a convex surface directed toward the object side. The fifth lens group G5 includes a biconvex positive lens, and a cemented lens of a biconvex positive lens and a biconcave negative lens. The sixth lens group G6 includes a positive meniscus lens having a concave surface directed toward the object side.

An aspheric surface is provided to a total of six surfaces namely, both surfaces of the negative meniscus lens (positioned toward the third lens group G3) having the convex surface directed toward the object side in the second lens group G2, both surfaces of the biconvex positive lens of the fourth lens group G4, and both surfaces of the positive meniscus lens having the concave surface directed toward the object side in the sixth lens group G6.

Figure 7A:
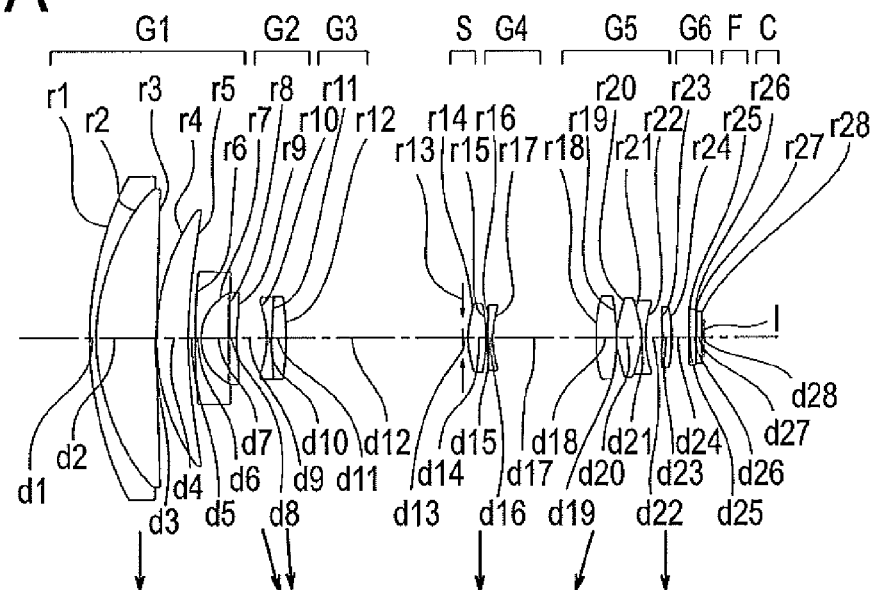
FIG. 7A, FIG. 7B, and FIG. 7C are cross-sectional views along an optical axis showing an optical arrangement at the time of infinite object point focusing of an image pickup optical system according to a fourth embodiment of the present invention, where.
Figure 7B:
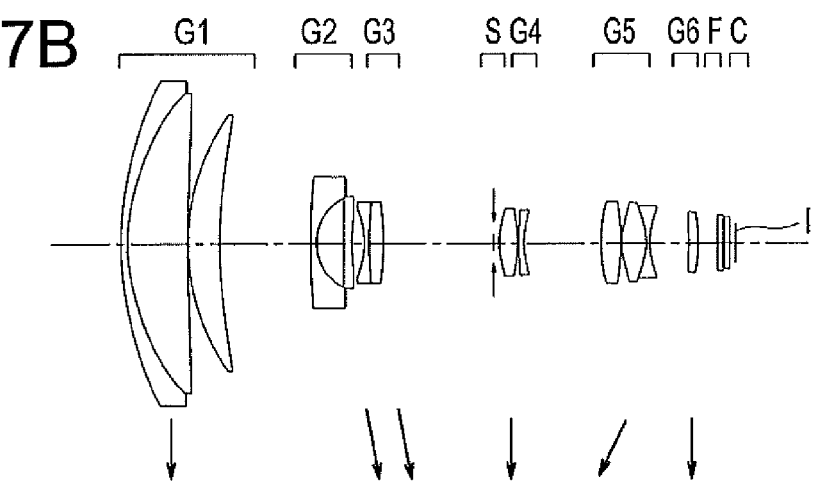
Figure 7C:
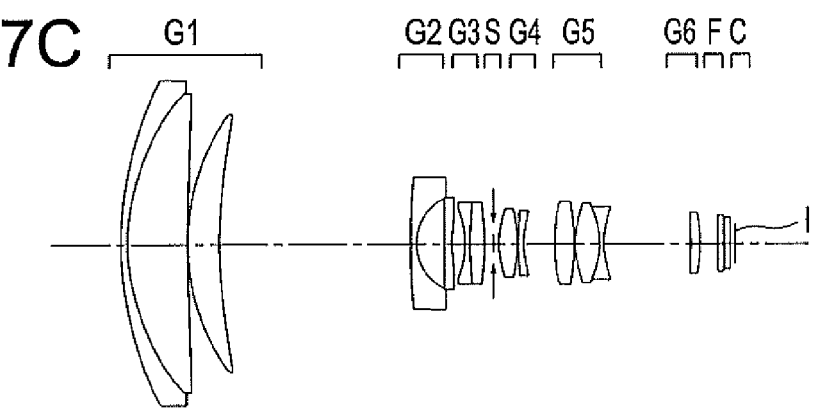

Next, an image pickup optical system according to a fourth embodiment of the present invention will be described below. FIG. 7A, FIG. 7B, and FIG. 7C are cross-sectional views along an optical axis showing an optical arrangement at the time of infinite object point focusing of the image pickup optical system according to the fourth embodiment of the present invention, where, FIG. 7A is a cross-sectional view at a wide angle end, FIG. 7B is a cross-sectional view in an intermediate state, and FIG. 7C is a cross-sectional view at a telephoto end.

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object focusing of the image pickup optical system according to the fourth embodiment, where, FIG. 8A, FIG. 8B, FIG. 8C, and FIG. 8D show spherical aberration (SA), astigmatism (AS), distortion (DT), and chromatic aberration of magnification (CC) at the wide angle end, FIG. 8E, FIG. 8F, FIG. 8G, and FIG. 8H show spherical aberration (SA), astigmatism (AS), distortion (DT), and chromatic aberration of magnification (CC) in the intermediate state, and FIG. 8I, FIG. 8J, FIG. 8K, and FIG. 8L show spherical aberration (SA), astigmatism (AS), distortion (DT), and chromatic aberration of magnification (CC) at the telephoto end.

The zoom lens (image pickup optical system) according to the fourth embodiment, as shown in FIG. 7A, FIG. 7B, and FIG. 7C, includes in order from an object side, a first lens group G1 having a positive refractive power, a second lens group G2 having a negative refractive power, a third lens group G3 having a negative refractive power, an aperture stop S, a fourth lens group G4 having a positive refractive power, a fifth lens group G5 having a positive refractive power, and a sixth lens group G6 having a positive refractive power.

At the time of zooming from the wide angle end to the telephoto end, the first lens group G1 is fixed, the second lens group G2 moves toward an image side, the fourth lens group G4 is fixed, the fifth lens group G5 moves toward the object side, and the sixth lens group G6 is fixed. Moreover, the third lens group G3 moves toward an image side, but from the wide angle end up to the intermediate state, does not move toward the image side together with the second lens group G2, and from the intermediate state up to the telephoto end, the third lens group G3 moves toward the image side together with the second lens group G2. Therefore, at the time of zooming, a distance between the second lens group G2 and the third lens group G3 decreases from the wide angle end to the intermediate state, and thereafter, up to the telephoto end, the distance between the second lens group G2 and the third lens group G3 is constant.

The first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, and a negative meniscus lens having a convex surface directed toward the object side. The third lens group G3 includes a cemented lens of a biconcave negative lens and a biconvex positive lens. The fourth lens group G4 includes a biconvex positive lens, and a negative meniscus lens having a convex surface directed toward the object side. The fifth lens group G5 includes a biconvex positive lens, and a cemented lens of a biconvex positive lens and a biconcave negative lens. The sixth lens group G6 includes a positive meniscus lens having a concave surface directed toward the object side.

An aspheric surface is provided to a total of six surfaces namely, both surfaces of the negative meniscus lens (positioned toward the third lens group G3) having the convex surface directed toward the object side in the second lens group G2, both surfaces of the biconvex positive lens in the fourth lens group G4, and both surfaces of the positive meniscus lens having the concave surface directed toward the object side in the sixth lens group G6.

Figure 9A:
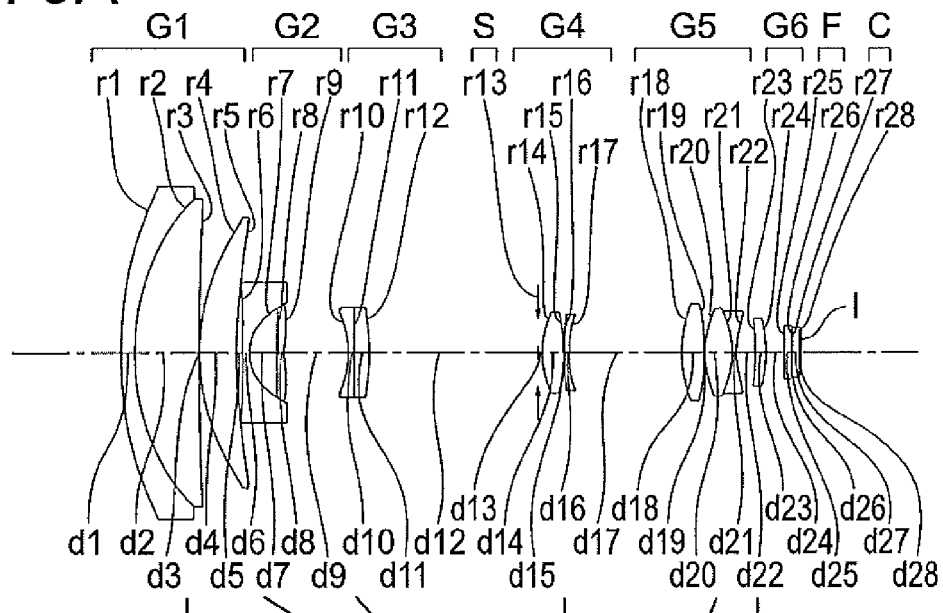
FIG. 9A, FIG. 9B, and FIG. 9C are cross-sectional views along an optical axis showing an optical arrangement at the time of infinite object point focusing of an image pickup optical system according to a fifth embodiment of the present invention, where.
Figure 9B:
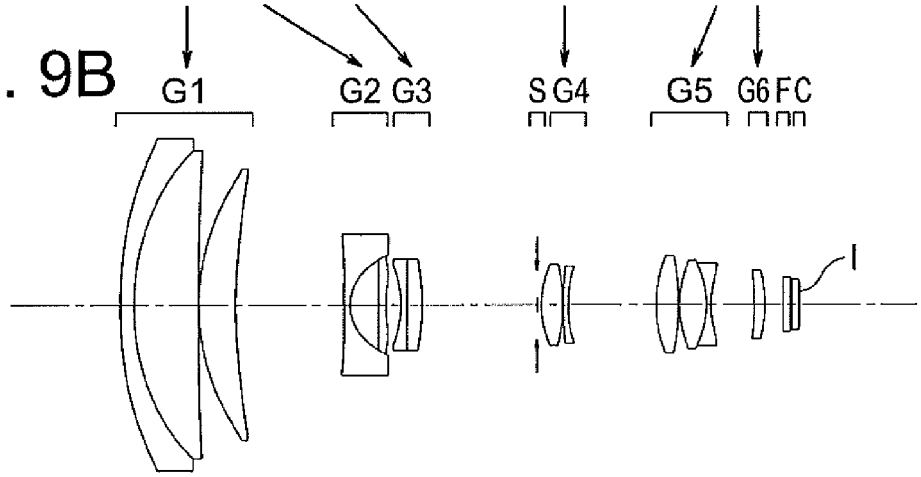
Figure 9C:
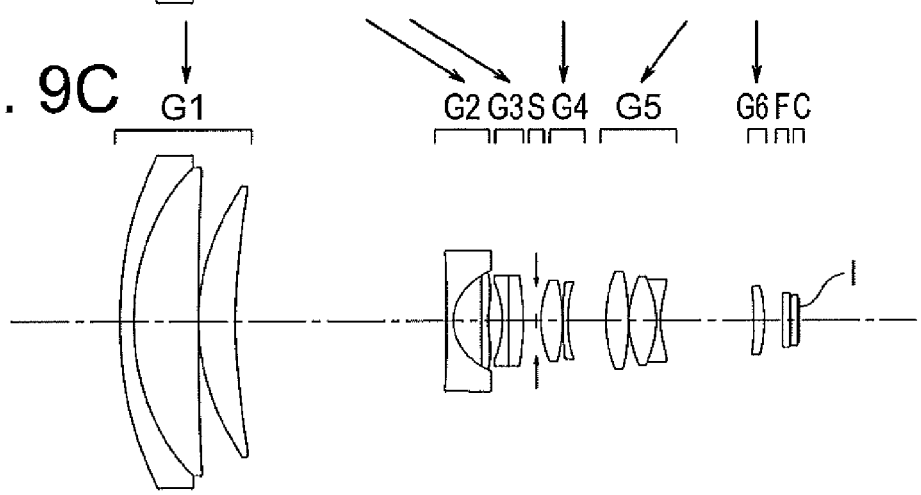

Next, an image pickup optical system according to a fifth embodiment of the present invention will be described below. FIG. 9A, FIG. 9B, and FIG. 9C are cross-sectional views along an optical axis showing an optical arrangement at the time of infinite object point focusing of the image pickup optical system according to the fifth embodiment of the present invention, where, FIG. 9A is a cross-sectional view at a wide angle end, FIG. 9B is a cross-sectional view in an intermediate state, and FIG. 9C is a cross-sectional view at a telephoto end.

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the image pickup optical system according to the fifth embodiment, where, FIG. 10A, FIG. 10B, FIG. 10C, and FIG. 10D show spherical aberration (SA), astigmatism (AS), distortion (DT), and chromatic aberration of magnification (CC) at the wide angle end, FIG. 10E, FIG. 10F, FIG. 10G, and FIG. 10H show spherical aberration (SA), astigmatism (AS), distortion (DT), and chromatic aberration of magnification (CC) in the intermediate state, and FIG. 10I, FIG. 10J, FIG. 10K, and FIG. 10L show spherical aberration (SA), astigmatism (AS), distortion (DT), and chromatic aberration of magnification (CC) at the telephoto end.

The zoom lens (image pickup optical system) according to the fifth embodiment, as shown in FIG. 9A, FIG. 9B, and FIG. 9C, includes in order from an object side, a first lens group G1 having a positive refractive power, a second lens group G2 having a negative refractive power, a third lens group G3 having a negative refractive power, an aperture stop S, a fourth lens group G4 having a positive refractive power, a fifth lens group G5 having a positive refractive power, and a sixth lens group G6 having a positive refractive power.

At the time of zooming from the wide angle end to the telephoto end, the first lens group G1 is fixed, the second lens group G2 moves toward an image side, the fourth lens group G4 is fixed, the fifth lens group G5 moves toward the object side, and the sixth lens group G6 is fixed. Moreover, the third lens group G3 moves toward an image side, but from the wide angle end up to the intermediate state, does not move toward the image side together with the second lens group G2, and from the intermediate state up to the telephoto end, the third lens group G3 moves toward the image side together with the second lens group G2. Therefore, at the time of zooming, a distance between the second lens group G2 and the third lens group G3 decreases from the wide angle end to the intermediate state, and thereafter, up to the telephoto end, the distance between the second lens group G2 and the third lens group G3 is constant.

The first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a biconcave negative lens, and a negative meniscus lens having a convex surface directed toward the object side. The third lens group G3 includes a cemented lens of a biconcave negative lens and a biconvex positive lens. The fourth lens group G4 includes a biconvex positive lens, and a negative meniscus lens having a convex surface directed toward the object side. The fifth lens group G5 includes a biconvex positive lens, and a cemented lens of a biconvex positive lens and a biconcave negative lens. The sixth lens group G6 includes a positive meniscus lens having a concave surface directed toward the object side.

An aspheric surface is provided to a total of six surfaces namely, both surfaces of the negative meniscus lens having the convex surface directed toward the object side in the second lens group G2, both surfaces of the biconvex positive lens in the fourth lens group G4, and both surfaces of the positive meniscus lens having the concave surface directed toward the object side in the sixth lens group G6.

Next, numerical data of optical components comprising the imaging optical system of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, v1, vd2, . . . stands for an Abbe number of each lens, * stands for an aspheric surface, FL stands for a focal length of a total optical system, FNO. stands for F-number, ω stands for a half angle of field, fb stands for a back focus, WE denotes a wide angle end, ST denotes an intermediate state, TE denotes a telephoto end.

A shape of an aspheric surface is defined by the following expression where the direction of the optical axis is represented by z, the direction orthogonal to the optical axis is represented by y, a conical coefficient is represented by K, aspheric surface coefficients are represented by $A_4$, $A_6$, $A_8$, $A_{10}$, $$Z=(y^2/r)/[1+\{1-(1+K)(y/r)^2\}^{1/2}]+A_4y^4+A_6y^6+A_8y^8+A_{10}y^{10}$$

Further, e stands for exponent of ten. These symbols are commonly used in the following numerical data for each example. Numerical example 1

Unit mm

Surface data

| Surface no. | r | d | nd | vd |
|---|---|---|---|---|
| Object plane | ∞ | ∞ | | |
| 1 | 57.710 | 2.00 | 1.84666 | 23.78 |
| 2 | 34.286 | 9.60 | 1.48749 | 70.23 |
| 3 | 583.367 | 0.15 | | |
| 4 | 33.156 | 5.40 | 1.72916 | 54.68 |
| 5 | 99.533 | Variable | | |
| 6 | 401.887 | 1.10 | 1.72916 | 54.68 |
| 7 | 7.299 | 4.03 | | |
| 8* | 53.197 | 1.10 | 1.53368 | 55.87 |
| 9* | 19.372 | Variable | | |
| 10 | −14.495 | 0.85 | 1.61800 | 63.40 |
| 11 | 154.322 | 2.20 | 1.94595 | 17.98 |
| 12 | −30.574 | Variable | | |
| 13(stop) | ∞ | 0.70 | | |
| 14* | 13.039 | 3.20 | 1.53368 | 55.87 |
| 15* | −19.646 | 0.15 | | |
| 16 | 66.047 | 0.70 | 1.84666 | 23.78 |
| 17 | 17.232 | Variable | | |
| 18 | 20.705 | 3.40 | 1.71300 | 53.87 |
| 19 | −33.033 | 0.15 | | |
| 20 | 16.182 | 3.80 | 1.59551 | 39.24 |
| 21 | −16.182 | 0.70 | 1.80518 | 25.42 |
| 22 | 15.696 | Variable | | |
| 23* | −79.083 | 1.60 | 1.53368 | 55.87 |
| 24* | −13.627 | 2.70 | | |
| 25 | ∞ | 1.00 | 1.51633 | 64.14 |
| 26 | ∞ | 0.30 | | |
| 27 | ∞ | 0.70 | 1.51633 | 64.14 |
| 28 | ∞ | 0.50 | | |
| Image plane (Light receiving surface) | ∞ | | | |

Aspherical surface data

8th surface

K = 0.000
A4 = −5.03000e−04, A6 = 7.45000e−06, A8 = −2.42000e−08,
A10 = −1.98000e−10

-continued

Unit mm

9th surface

K = 0.000
A4 = −7.17050e−04, A6 = 7.98000e−06, A8 = −4.40000e−08,
A10 = −7.95000e−10
14th surface K = 0.000
A4 = −9.56000e−05, A6 = 2.38000e−08
15th surface K = 0.000
A4 = 6.97e−05
23th surface K = 0.000
A4 = −5.35360e−04, A6 = 1.44000e−05, A8 = 9.60000e−08
24th surface K = 0.000
A4 = −3.19000e−05, A6 = 1.02000e−05, A8 = 3.26000e−07

Zoom data

| | WE | ST | TE |
|---|---|---|---|
| FL | 4.04 | 9.70 | 46.69 |
| FNO. | 1.83 | 2.02 | 2.82 |
| Angle of field 2ω | 75.84 | 33.88 | 7.12 |
| fb (in air) | 4.61 | 4.65 | 4.69 |
| Lens total length (in air) | 99.14 | 98.48 | 98.52 |
| d5 | 0.90 | 15.90 | 30.67 |
| d9 | 4.60 | 2.10 | 2.10 |
| d12 | 28.82 | 16.32 | 1.55 |
| d17 | 16.67 | 12.10 | 4.73 |
| d22 | 2.71 | 6.58 | 13.95 |

Unit focal length

| f1 = 55.14 | f2 = −8.06 | f3 = −134.87 | f4 = 29.10 |
|---|---|---|---|
| f5 = 22.56 | f6 = 30.59 | | |

Numerical Example 2

Unit mm

Surface data

| Surface no. | r | d | nd | vd |
|---|---|---|---|---|
| Object plane | ∞ | ∞ | | |
| 1 | 57.610 | 2.00 | 1.84666 | 23.78 |
| 2 | 34.286 | 9.60 | 1.48749 | 70.23 |
| 3 | 583.367 | 0.15 | | |
| 4 | 33.205 | 5.40 | 1.72916 | 54.68 |
| 5 | 99.758 | Variable | | |
| 6 | 401.887 | 1.10 | 1.72916 | 54.68 |
| 7 | 7.296 | 4.03 | | |
| 8* | 53.197 | 1.10 | 1.53368 | 55.87 |
| 9* | 19.372 | Variable | | |
| 10 | −14.495 | 0.85 | 1.61800 | 63.40 |
| 11 | 154.322 | 2.20 | 1.94595 | 17.98 |
| 12 | −30.574 | Variable | | |
| 13(stop) | ∞ | 0.70 | | |
| 14* | 13.039 | 3.20 | 1.53368 | 55.87 |
| 15* | −19.646 | 0.15 | | |
| 16 | 65.968 | 0.70 | 1.84666 | 23.78 |
| 17 | 17.213 | Variable | | |
| 18 | 20.705 | 3.40 | 1.71300 | 53.87 |
| 19 | −33.033 | 0.15 | | |
| 20 | 16.182 | 3.80 | 1.59551 | 39.24 |
| 21 | −16.182 | 0.70 | 1.80518 | 25.42 |

-continued

Unit mm

| 22 | 15.696 | Variable | | |
|---|---|---|---|---|
| 23* | −79.083 | 1.60 | 1.53368 | 55.87 |
| 24* | −13.627 | 2.70 | | |
| 25 | ∞ | 1.00 | 1.51633 | 64.14 |
| 26 | ∞ | 0.30 | | |
| 27 | ∞ | 0.70 | 1.51633 | 64.14 |
| 28 | ∞ | 0.50 | | |
| Image plane (Light receiving surface) | ∞ | | | |

Aspherical surface data

8th surface

K = 0.000
A4 = −5.03027e−04, A6 = 7.45000e−06, A8 = −2.42000e−08,
A10 = −1.98000e−10
9th surface K = 0.000
A4 = −7.17050e−04, A6 = 7.98000e−06, A8 = −4.22000e−08,
A10 = −7.95000e−10
14th surface K = 0.000
A4 = −9.56000e−05, A6 = 2.38000e−08
15th surface K = 0.000
A4 = 6.97e−05
23th surface K = 0.000
A4 = −5.35356e−04, A6 = 1.49000e−05, A8 = 9.60000e−08
24th surface K = 0.000
A4 = −3.19000e−05, A6 = 1.02000e−05, A8 = 3.26000e−07

Zoom data

| | WE | ST | TE |
|---|---|---|---|
| FL | 4.05 | 9.71 | 46.46 |
| FNO. | 1.83 | 2.02 | 2.82 |
| Angle of field 2ω | 75.96 | 33.86 | 7.16 |
| fb (in air) | 4.61 | 4.65 | 4.69 |
| Lens total length (in air) | 99.17 | 98.51 | 98.55 |
| d5 | 0.90 | 15.90 | 30.62 |
| d9 | 4.60 | 2.10 | 2.10 |
| d12 | 28.82 | 16.32 | 1.60 |
| d17 | 16.69 | 12.12 | 4.76 |
| d22 | 2.72 | 6.59 | 13.95 |

Unit focal length

| f1 = 55.12 | f2 = −8.06 | f3 = −134.87 | f4 = 29.13 |
|---|---|---|---|
| f5 = 22.56 | f6 = 30.59 | | |

Numerical Example 3

Unit mm

Surface data

| Surface no. | r | d | nd | vd |
|---|---|---|---|---|
| Object plane | ∞ | ∞ | | |
| 1 | 57.743 | 2.00 | 1.84666 | 23.78 |
| 2 | 34.334 | 9.70 | 1.48749 | 70.23 |

-continued

Unit mm

| | | | | |
|---|---|---|---|---|
| 3 | 533.369 | 0.15 | | |
| 4 | 33.217 | 5.40 | 1.72916 | 54.68 |
| 5 | 99.739 | Variable | | |
| 6 | 401.890 | 1.10 | 1.72916 | 54.68 |
| 7 | 7.293 | 4.09 | | |
| 8* | 53.008 | 1.10 | 1.53368 | 55.87 |
| 9* | 19.388 | Variable | | |
| 10 | −14.499 | 0.85 | 1.61800 | 63.40 |
| 11 | 152.297 | 2.20 | 1.94595 | 17.98 |
| 12 | −30.595 | Variable | | |
| 13(stop) | ∞ | 0.70 | | |
| 14* | 13.041 | 3.20 | 1.53368 | 55.87 |
| 15* | −19.650 | 0.15 | | |
| 16 | 66.026 | 0.70 | 1.84666 | 23.78 |
| 17 | 17.209 | Variable | | |
| 18 | 20.723 | 3.40 | 1.71300 | 53.87 |
| 19 | −33.024 | 0.15 | | |
| 20 | 16.170 | 3.80 | 1.59551 | 39.24 |
| 21 | −16.170 | 0.70 | 1.80518 | 25.42 |
| 22 | 15.688 | Variable | | |
| 23* | −79.198 | 1.60 | 1.53368 | 55.87 |
| 24* | −13.604 | 2.70 | | |
| 25 | ∞ | 1.00 | 1.51633 | 64.14 |
| 26 | ∞ | 0.30 | | |
| 27 | ∞ | 0.70 | 1.51633 | 64.14 |
| 28 | ∞ | 0.50 | | |
| Image plane (Light receiving surface) | ∞ | | | |

Aspherical surface data

8th surface

K = 0.000
A4 = −5.00871e−04, A6 = 7.43000e−06, A8 = −2.30000e−08,
A10 = −1.89000e−10

9th surface

K = 0.000
A4 = −7.17111e−04, A6 = 8.00000e−06, A8 = −4.25000e−08,
A10 = −7.75000e−10

14th surface

K = 0.000
A4 = −9.54000e−05, A6 = 2.47000e−08

15th surface

K = 0.000
A4 = 6.96e−05

23th surface

K = 0.000
A4 = −5.35346e−04, A6 = 1.50000e−05, A8 = 1.10000e−07

24th surface

K = 0.000
A4 = −2.76000e−05, A6 = 1.04000e−05, A8 = 3.34000e−07

Zoom data

| | WE | ST | TE |
|---|---|---|---|
| FL | 4.03 | 9.57 | 46.18 |
| FNO. | 1.83 | 2.02 | 2.82 |
| Angle of field 2ω | 76.26 | 34.34 | 7.20 |
| fb (in air) | 4.61 | 4.65 | 4.70 |
| Lens total length (in air) | 99.50 | 98.84 | 98.89 |
| d5 | 0.90 | 15.85 | 30.71 |
| d9 | 4.60 | 2.10 | 2.10 |
| d12 | 28.91 | 16.46 | 1.60 |
| d17 | 16.78 | 12.23 | 4.66 |
| d22 | 2.71 | 6.55 | 14.13 |

-continued

Unit mm

Unit focal length f1 = 55.44  f2 = −8.05  f3 = −135.17  f4 = 29.16
f5 = 22.58  f6 = 30.52

Numerical Example 4

Unit mm

Surface data

| Surface no. | r | d | nd | vd |
|---|---|---|---|---|
| Object plane | ∞ | ∞ | | |
| 1 | 57.633 | 1.10 | 1.84666 | 23.78 |
| 2 | 34.422 | 9.50 | 1.48749 | 70.23 |
| 3 | 624.118 | 0.15 | | |
| 4 | 33.573 | 5.40 | 1.72916 | 54.68 |
| 5 | 102.157 | Variable | | |
| 6 | 315.891 | 1.10 | 1.72916 | 54.68 |
| 7 | 7.390 | 4.29 | | |
| 8* | 51.959 | 1.10 | 1.53368 | 55.87 |
| 9* | 18.046 | Variable | | |
| 10 | −15.144 | 0.85 | 1.61800 | 63.40 |
| 11 | 213.826 | 2.20 | 1.94595 | 17.98 |
| 12 | −29.905 | Variable | | |
| 13(stop) | ∞ | 0.70 | | |
| 14* | 12.960 | 3.20 | 1.53368 | 55.87 |
| 15* | −19.806 | 0.15 | | |
| 16 | 84.844 | 0.70 | 1.84666 | 23.78 |
| 17 | 17.814 | Variable | | |
| 18 | 20.320 | 3.40 | 1.72342 | 37.95 |
| 19 | −33.647 | 0.15 | | |
| 20 | 16.079 | 3.80 | 1.58313 | 59.38 |
| 21 | −16.079 | 0.70 | 1.80518 | 25.42 |
| 22 | 15.753 | Variable | | |
| 23* | −92.156 | 1.60 | 1.53368 | 55.87 |
| 24* | −14.108 | 2.70 | | |
| 25 | ∞ | 1.00 | 1.51633 | 64.14 |
| 26 | ∞ | 0.30 | | |
| 27 | ∞ | 0.70 | 1.51633 | 64.14 |
| 28 | ∞ | 0.50 | | |
| Image plane (Light receiving surface) | ∞ | | | |

Aspherical surface data

8th surface

K = 0.000
A4 = −4.919536−04, A6 = 6.790006−06, A8 = −1.280006−08,
A10 = −6.610006−10

9th surface

K = 0.000
A4 = −7.09915e−04, A6 = 7.88000e−06, A8 = −6.18000e−08,
A10 = −6.52000e−10

14th surface

K = 0.000
A4 = −9.18000e−05, A6 = 1.69000e−09

15th surface

K = 0.000
A4 = 7.15e−05

23th surface

K = 0.000
A4 = −4.80905e−04, A6 = 1.19000e−05, A8 = 4.62000e−08

-continued

| Unit mm |
|---|

| 24th surface |
|---|
| K = 0.000 |
| A4 = −2.15000e−05, A6 = 1.20000e−05, A8 = 6.33000e−08 |

| Zoom data | | | |
|---|---|---|---|
| | WE | ST | TE |
| FL | 4.01 | 8.94 | 46.53 |
| FNO. | 1.83 | 2.02 | 2.82 |
| Angle of field 2ω | 76.42 | 36.47 | 7.16 |
| fb (in air) | 4.61 | 4.66 | 4.69 |
| Lens total length (in air) | 98.54 | 97.79 | 97.82 |
| d5 | 1.00 | 15.00 | 31.01 |
| d9 | 5.20 | 2.10 | 2.10 |
| d12 | 28.61 | 17.61 | 1.60 |
| d17 | 16.08 | 12.01 | 4.74 |
| d22 | 2.96 | 6.33 | 13.60 |

| Unit focal length | | | |
|---|---|---|---|
| f1 = 55.00 | f2 = −7.99 | f3 = −180.89 | f4 = 30.12 |
| f5 = 22.41 | f6 = 30.99 | | |

Numerical Example 5

| Unit mm |
|---|
| Surface data |

| Surface no. | r | d | nd | vd |
|---|---|---|---|---|
| Object plane | ∞ | ∞ | | |
| 1 | 57.710 | 2.00 | 1.84666 | 23.78 |
| 2 | 34.286 | 9.60 | 1.48749 | 70.24 |
| 3 | 583.367 | 0.15 | | |
| 4 | 34.952 | 5.40 | 1.72916 | 54.68 |
| 5 | 119.010 | Variable | | |
| 6 | −699.800 | 1.10 | 1.72916 | 54.68 |
| 7 | 7.469 | 4.03 | | |
| 8* | 53.197 | 1.10 | 1.53368 | 55.90 |
| 9* | 19.372 | Variable | | |
| 10 | −16.251 | 0.85 | 1.61800 | 63.40 |
| 11 | 154.322 | 2.20 | 1.94595 | 17.98 |
| 12 | −34.424 | Variable | | |
| 13(stop) | ∞ | 0.70 | | |
| 14* | 13.039 | 3.20 | 1.53368 | 55.90 |
| 15* | −19.646 | 0.15 | | |
| 16 | 66.047 | 0.70 | 1.84666 | 23.78 |
| 17 | 17.232 | Variable | | |
| 18 | 20.705 | 3.40 | 1.71300 | 53.87 |
| 19 | −33.033 | 0.15 | | |
| 20 | 16.182 | 3.80 | 1.59551 | 39.24 |
| 21 | −16.182 | 0.70 | 1.80518 | 25.43 |
| 22 | 15.696 | Variable | | |
| 23* | −79.083 | 1.60 | 1.53368 | 55.90 |

-continued

| Unit mm | | | | |
|---|---|---|---|---|
| 24* | −13.627 | 2.70 | | |
| 25 | ∞ | 1.00 | 1.51633 | 64.14 |
| 26 | ∞ | 0.30 | | |
| 27 | ∞ | 0.70 | 1.51633 | 64.14 |
| 28 | ∞ | 0.50 | | |
| Image plane (Light receiving surface) | ∞ | | | |

| Aspherical surface data |
|---|

| 8th surface |
|---|
| K = 0.000 |
| A4 = −5.03000e−04, A6 = 7.44580e−06, A8 = −2.41570e−08, |
| A10 = −1.98340e−10 |

| 9th surface |
|---|
| K = 0.000 |
| A4 = −7.17050e−04, A6 = 7.98440e−06, A8 = −4.39600e−08, |
| A10 = −7.95120e−10 |

| 14th surface |
|---|
| K = 0.000 |
| A4 = −9.56000e−05, A6 = 2.38120e−08 |

| 15th surface |
|---|
| K = 0.000 |
| A4 = 6.97e−05 |

| 23rd surface |
|---|
| K = 0.000 |
| A4 = −5.35360e−04, A6 = 1.44300e−05, A8 = 9.60170e−08 |

| 24th surface |
|---|
| K = 0.000 |
| A4 = −3.18700e−05, A6 = 1.01620e−05, A8 = 3.26080e−07 |

| Zoom data | | | |
|---|---|---|---|
| | WE | ST | TE |
| FL | 3.93 | 9.49 | 45.19 |
| FNO. | 1.83 | 2.08 | 2.98 |
| Angle of field 2ω | 77.82 | 34.18 | 7.33 |
| fb (in air) | 4.61 | 4.63 | 4.61 |
| Lens total length (in air) | 99.55 | 99.58 | 99.56 |
| d5 | 0.90 | 15.90 | 30.77 |
| d9 | 9.30 | 2.10 | 2.10 |
| d12 | 24.52 | 16.72 | 1.85 |
| d17 | 16.59 | 12.91 | 5.39 |
| d22 | 2.79 | 6.47 | 13.99 |

| Unit focal length | | | |
|---|---|---|---|
| f1 = 55.28 | f2 = −8.01 | f3 = −148.93 | f4 = 29.10 |
| f5 = 22.56 | f6 = 30.59 | | |

Next, the values of conditional expressions (1) to (19) in the first to eighth examples are shown below.

| | | Example 1 | Example 2 |
|---|---|---|---|
| (1) | fg3/fg2 | 0.916 | 0.916 |
| (2) | (β45T/β45W)/(β23T/β23W) | 0.579 | 0.580 |
| (3) | β23T/β23W | 4.457 | 4.441 |
| (4) | |β23W| | 0.196 | 0.196 |
| (5) | |β23T| | 0.872 | 0.869 |
| (6) | f45W/f45T | 1.320 | 1.319 |
| (7) | |β45W| | 0.438 | 0.438 |
| (8) | |β45T| | 1.129 | 1.127 |

-continued

|  |  |  |  |
|---|---|---|---|
| (9) | (R52F − R52R)/(R52F + R52R) | 0.015 | 0.015 |
| (10) | (R522F + R522R)/(R522F − R522R) | 0.015 | 0.015 |
| (11) | (R42F − R42R)/(R42F + R42R) | 0.586 | 0.586 |
| (12) | |βFW| | 0.857 | 0.857 |
| (13) | f5/fF | 0.737 | 0.737 |
| (14) | f5/f4 | 0.775 | 0.774 |
| (15) | f5/fW | 5.577 | 5.574 |
| (16) | ff5/f5 | −1.169 | −1.169 |
| (17) | fb4/f4 | 0.875 | 0.875 |
| (18) | f1/fW | 13.648 | 13.609 |
| (19) | fW/f1234T | −0.017 | −0.017 |

|  |  | Example 3 | Example 4 |
|---|---|---|---|
| (1) | fg3/fg2 | 0.916 | 0.900 |
| (2) | (β45T/β45W)/(β23T/β23W) | 0.596 | 0.557 |
| (3) | β23T/β23W | 4.374 | 4.551 |
| (4) | |β23W| | 0.194 | 0.199 |
| (5) | |β23T| | 0.849 | 0.905 |
| (6) | f45W/f45T | 1.325 | 1.291 |
| (7) | |β45W| | 0.437 | 0.428 |
| (8) | |β45T| | 1.141 | 1.085 |
| (9) | (R52F − R52R)/(R52F + R52R) | 0.015 | 0.010 |
| (10) | (R522F + R522R)/(R522F − R522R) | 0.015 | 0.010 |
| (11) | (R42F − R42R)/(R42F + R42R) | 0.586 | 0.586 |
| (12) | |βFW| | 0.856 | 0.857 |
| (13) | f5/fF | 0.739 | 0.723 |
| (14) | f5/f4 | 0.774 | 0.744 |
| (15) | f5/fW | 5.599 | 5.577 |
| (16) | ff5/f5 | −1.169 | −1.174 |
| (17) | fb4/f4 | 0.875 | 0.876 |
| (18) | f1/fW | 13.758 | 13.716 |
| (19) | fW/f1234T | −0.017 | −0.016 |

|  |  | Example 5 |
|---|---|---|
| (1) | fg3/fg2 |  |
| (2) | (β45T/β45W)/(β23T/β23W) | 0.568 |
| (3) | β23T/β23W | 4.500 |
| (4) | |β23W| | 0.188 |
| (5) | |β23T| | 0.846 |
| (6) | f45W/f45T | 1.318 |
| (7) | |β45W| | 0.442 |
| (8) | |β45T| | 1.128 |
| (9) | (R52F − R52R)/(R52F + R52R) | 0.015 |
| (10) | (R522F + R522R)/(R522F − R522R) | 0.015 |
| (11) | (R42F − R42R)/(R42F + R42R) | 0.586 |
| (12) | |βFW| | 0.856 |
| (13) | f5/fF | 0.737 |
| (14) | f5/f4 | 0.775 |
| (15) | f5/fW | 5.739 |
| (16) | ff5/f5 | −1.169 |
| (17) | fb4/f4 | 0.875 |
| (18) | f1/fW | 14.059 |
| (19) | fW/f1234T | −0.016 |

Moreover, the value of each parameter is shown below.

|  | Example 1 | Example 2 | Example 3 |
|---|---|---|---|
| β23W | −0.196 | −0.196 | −0.194 |
| β23T | −0.872 | −0.869 | −0.849 |
| β45W | −0.438 | −0.438 | −0.437 |
| β45T | −1.129 | −1.127 | −1.141 |
| β45T/β45W | 2.579 | 2.574 | 2.608 |
| f45W | 18.664 | 18.680 | 18.731 |
| f45T | 14.144 | 14.161 | 14.136 |
| fT/fW | 11.557 | 11.472 | 11.459 |
| βFW | 0.857 | 0.857 | 0.856 |
| f4 | 29.104 | 29.132 | 29.159 |
| f5 | 22.555 | 22.555 | 22.567 |
| fF | 30.590 | 30.590 | 30.519 |

-continued

|  | Example 4 | Example 5 |
|---|---|---|
| β23W | −0.199 | −0.188 |
| β23T | −0.905 | −0.846 |
| β45W | −0.428 | −0.442 |
| β45T | −1.085 | −1.128 |
| β45T/β45W | 2.533 | 2.556 |
| f45W | 18.432 | 18.623 |
| f45T | 14.278 | 14.132 |
| fT/fW | 11.603 | 11.499 |
| βFW | 0.857 | 0.856 |
| f4 | 30.117 | 29.104 |
| f5 | 22.398 | 22.555 |
| fF | 30.993 | 30.591 |

It is possible to use such an imaging (image pickup) optical system of the present invention described above in an image pickup apparatus in which an image of an object is photographed by an electric image pickup element such as a CCD and a CMOS, particularly a digital camera and a video camera, a personal computer, a telephone, and a portable terminal which are examples of an information processing unit, particularly a portable telephone which is easy to carry. Moreover, it is possible to use the imaging (image pickup) optical system of the present invention in an image transmission apparatus and an image transmission system. Embodiments thereof will be exemplified below.

Figure 11:
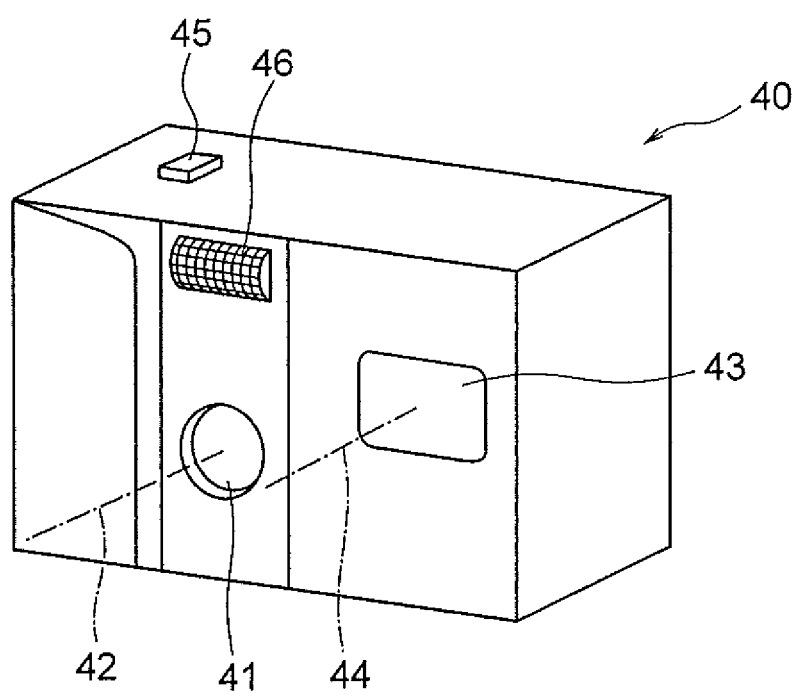
FIG. 11 is a front perspective view showing an appearance of a digital camera 40 in which, an optical system according to the present invention is incorporated.
Figure 12:
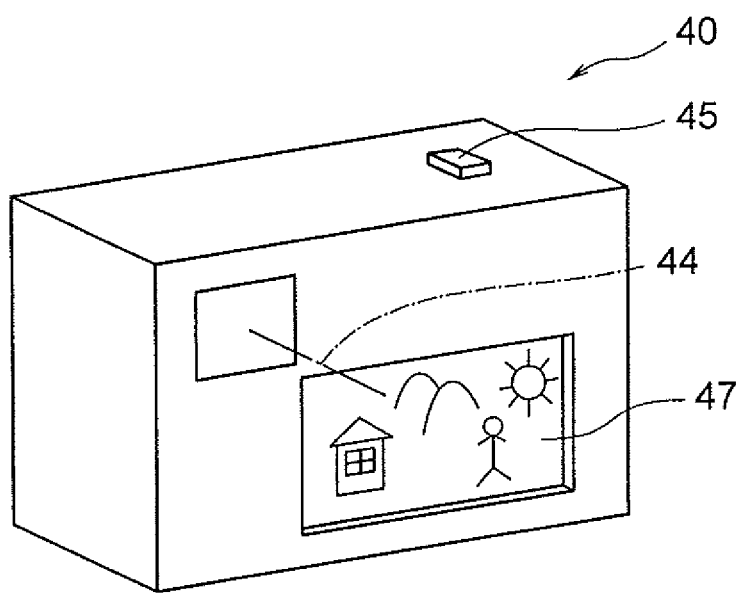
FIG. 12 is a rear perspective view of the digital camera 40.
Figure 13:
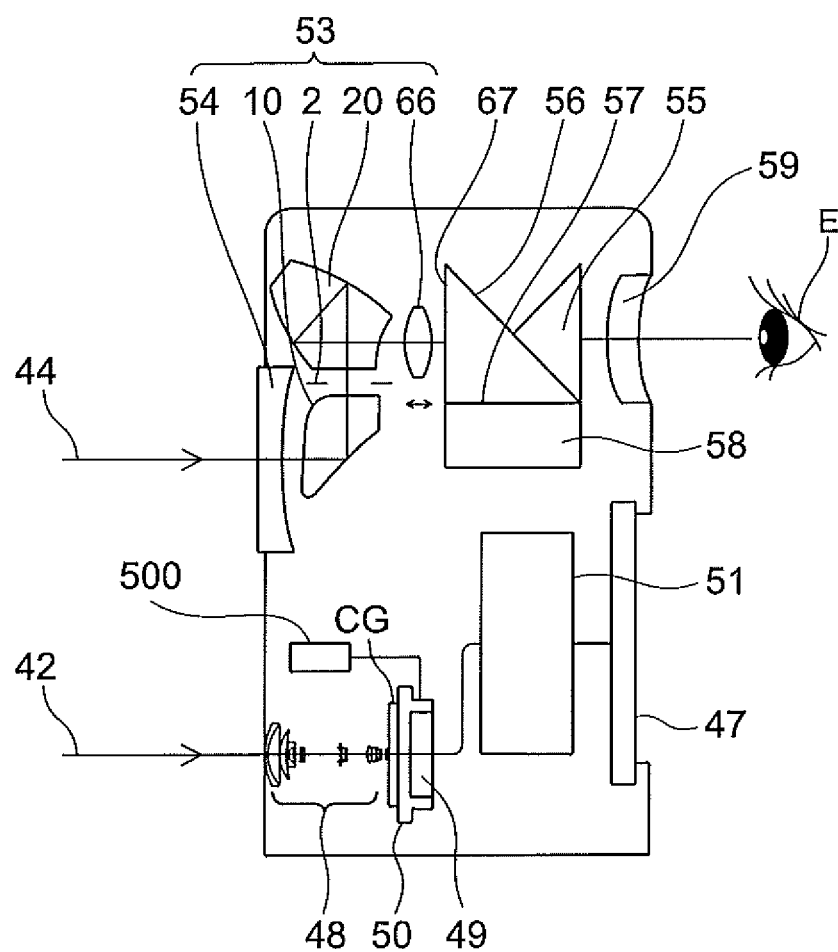
FIG. 13 is a cross-sectional view showing an optical arrangement of the digital camera 40.

In FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 having an optical path for photography 42, a finder optical system. 43 having an optical path for finder 44, a shutter button 45, a flash 46, and a liquid-crystal display monitor 47. Moreover, when the shutter button 45 disposed at an upper portion of the camera 40 is pressed by a photographer, in conjugation with this, a photograph is taken through the photographic optical system 41 such as the image pickup optical system 48 in the first embodiment.

An object image formed by the photographic optical system 41 is formed on an image pickup surface of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame 57 of a Porro prism 55 which is an image erecting member. On a rear side of this Porro prism 55, an eyepiece optical system 59 which guides an image formed as an erected normal image to a viewer's eyeball E is disposed.

By the digital camera 40 structured in such manner, it is possible to realize an optical image pickup apparatus having a zoom lens with a reduced size and thickness, in which the number of structural components is reduced. Further, the present invention could be applied not only the above-mentioned collapsible type digital camera but also a bending type digital camera having a bending optical system.

The digital camera includes an auto-focus mechanism 500 which is integrated with an image pickup optical system. By installing the auto-focus mechanism 500, it is possible to focus at any object distance.

Moreover, it is desirable that the image pickup optical system 41 and an electronic image pickup element chip (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 14:
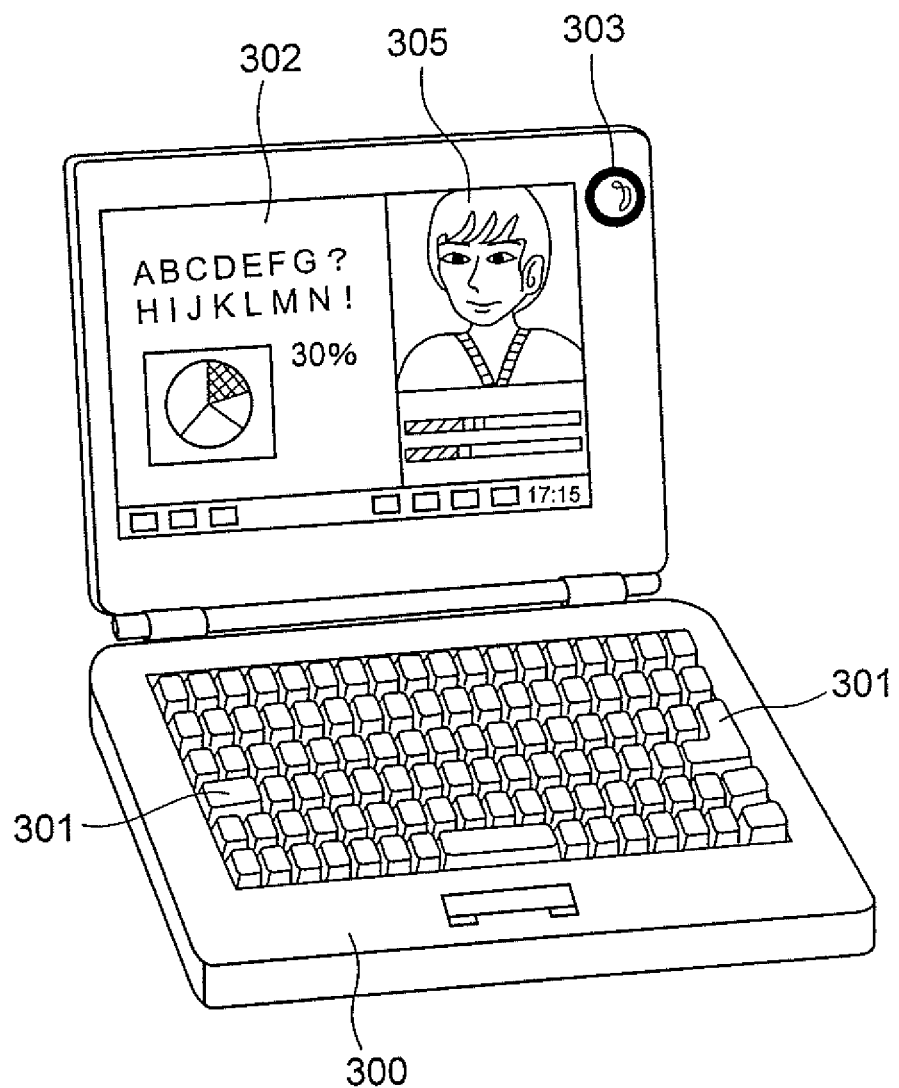
FIG. 14 is a front perspective view of a state in which, a cover of a personal computer 300 which is an example of an information processing system in which, the optical system according to the present invention is built-in as an objective optical system, is opened.
Figure 15:
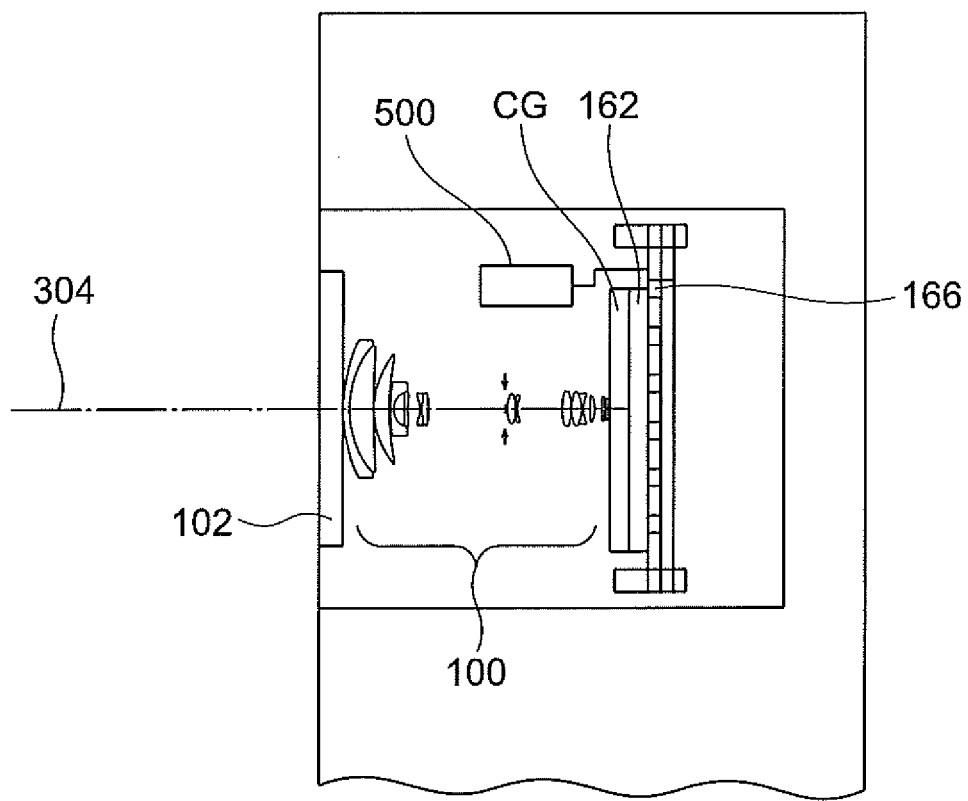
FIG. 15 is a cross-sectional view of a photographic optical system 303 of the personal computer 300.
Figure 16:
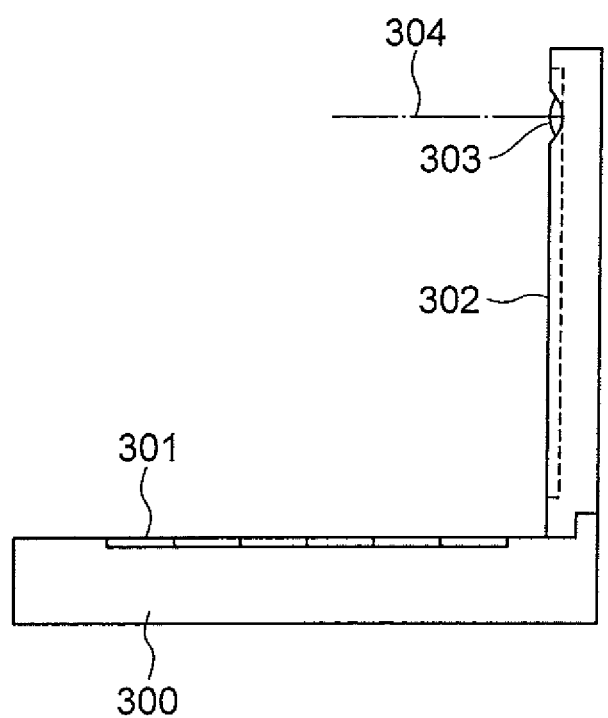
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 15. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system. 303 is built-in at a right side of the monitor 302, but without restricting to this location, the photographic optical system 303 may be anywhere around the monitor 302 and the keyboard 301.

This photographic optical system 303 has an objective optical system. 100 which includes the image pickup optical system in the first embodiment for example, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Figure 17A:
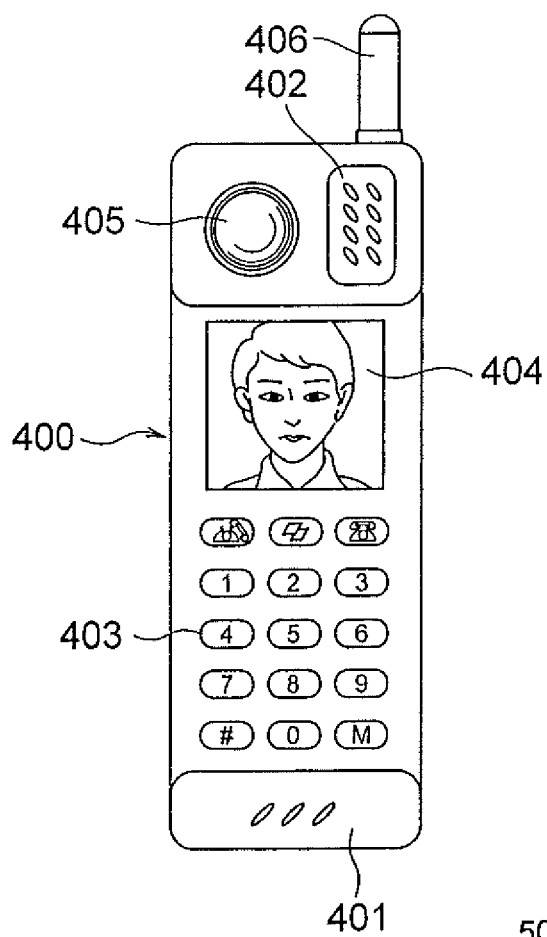
FIG. 17A, FIG. 17B, and FIG. 17C are diagrams showing a mobile telephone which is an example of an information processing apparatus in which, the optical system according to the present invention is built-in as a photographic optical system where.
Figure 17B:
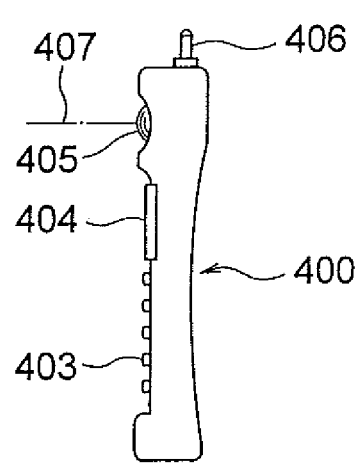
Figure 17C:
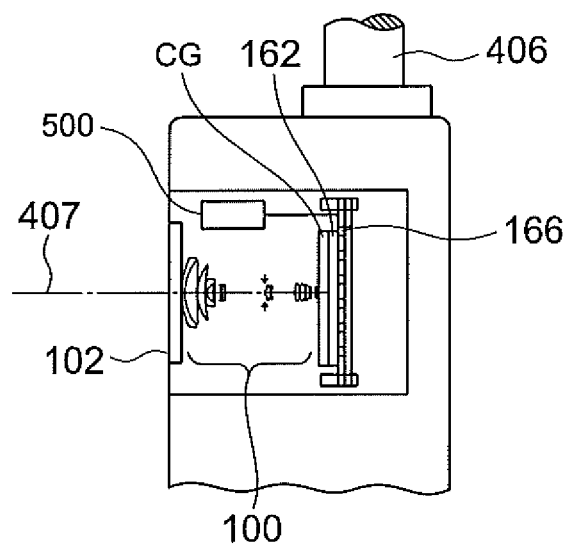

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 17A to FIG. 17C, the portable telephone 400 includes a microphone section 401, a speaker section 402, an input button 403, a monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

Figure 18:
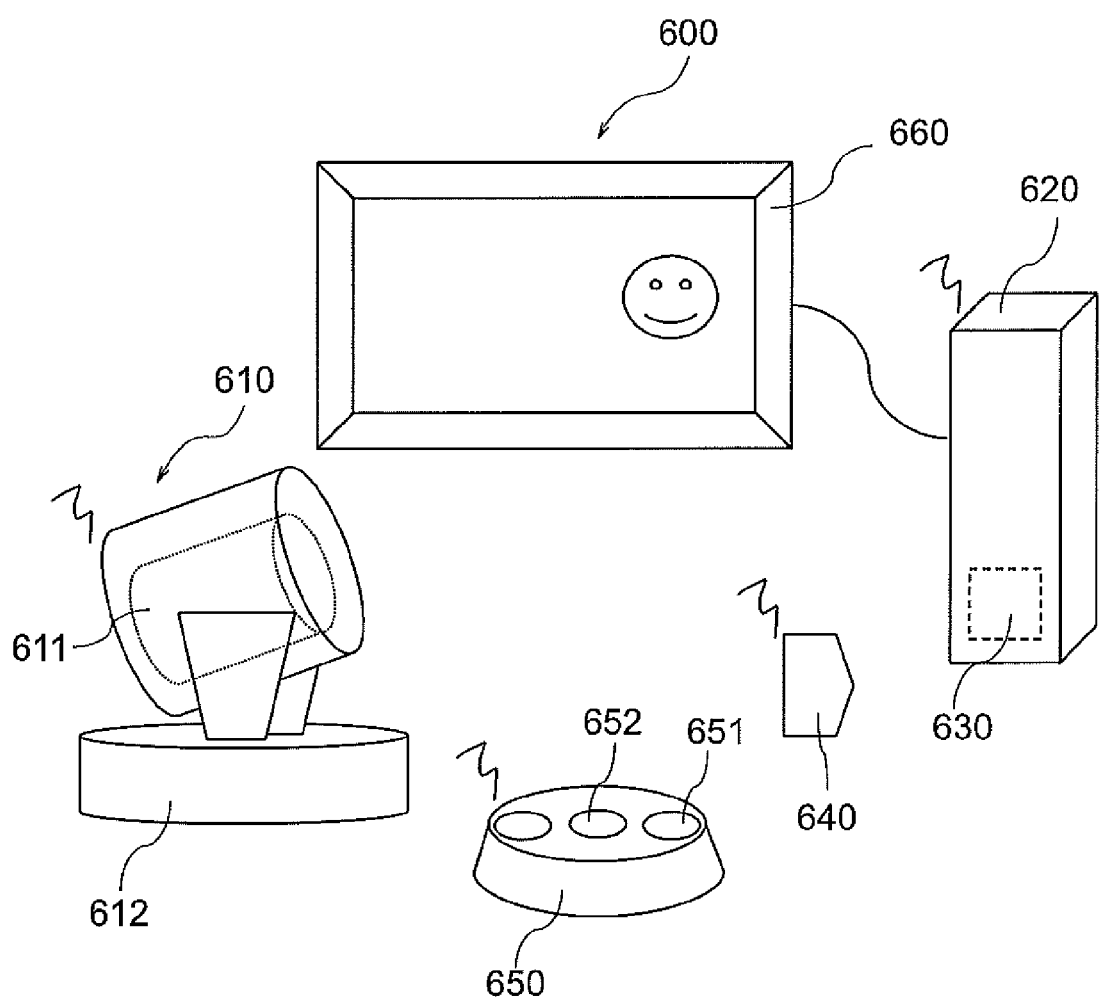
FIG. 18 is a diagram showing an arrangement of a television conference apparatus (image transmission apparatus)

Next, an image transmission apparatus in which the image pickup optical system according to the present invention is used will be described below. FIG. 18 shows an arrangement of a television conference apparatus which is an example of the image transmission apparatus. A television conference apparatus (image transmission apparatus) 600 includes a camera unit 610, a main unit 620, and a transmission section 630.

The camera unit 610 is an image acquiring apparatus. The camera unit 610 includes an image pickup apparatus 611 and a driving unit 612. The image pickup apparatus 611 includes the image pickup optical system according to the first embodiment for example, and an image pickup element. Photography of participants of conference (hereinafter, 'conference participants') and conference material is carried out by the image pickup apparatus 611. Moreover, the driving unit 612 has a rotating mechanism, and it is possible to direct the image pickup apparatus 611 in a desired direction by the rotating mechanism.

The main unit 620 is an information transmission apparatus. The main unit 620 has a function of processing an image and a video, a function of processing audio, a recording function, and a transceiving function. An image which has been picked up by the image pickup apparatus 611 is transmitted to the main unit 620 by a wireless-communication unit. The main unit 620 carries out processing of the image which has been transmitted from the image pickup apparatus 611 (image which has been acquired by the image pickup apparatus 611) as may be necessary. The image which has been processed by the main unit 620 is sent to the transmission section 630.

The transmission section 630 transmits the image which has been processed by the main unit 620 to an outside such as another television conference apparatus via a network. For this transmission, the transmission section 630 has a communication function for connecting to the network. In FIG. 18, the transmission section 630 is provided inside the main unit 620. However, the transmission section 630 may be separate from the main unit 620.

It is preferable that the image transmission apparatus 600 includes an operation unit 640. By including the operation unit 640, it is possible to carry out operation of the camera unit 610, the main unit 620, and the transmission section 630. Moreover, by including the operation unit 640, it is possible to operate an audio unit 650 and a display unit 660 which will be described later.

In the television conference apparatus 600 shown in FIG. 18, each of the camera unit 610, the main unit 620, the operation unit 640, the transmission section 630, and the audio unit 650 includes a wireless communication unit, and carries out wireless transmission of information.

Moreover, the image transmission apparatus 600 may further include the audio unit 650. The audio unit 650 has a microphone (audio acquiring section) 651 and a speaker audio output section) 652. Voice of the conference participants is acquired by the microphone 651. The voice which has been acquired is transmitted to the main unit 620, and is subjected to audio processing in the main unit 620 as may be necessary. The audio is transmitted to an outside such as another television conference apparatus through the transmission section 630. Accordingly, the conference participant is able to convey statements to other conference participants. Moreover, the conference participant is able to listen to words of other participants of conference via the speaker 652. In a case of transmitting only images, the audio unit 650 is not necessary.

Moreover, the image transmission apparatus 600 may include further the display unit (image display apparatus) 660. By including the display unit 660, the conference participant is able to see an image which has been transmitted from another television conference apparatus via the display unit 660. Displays such as a liquid crystal display and an organic EL (electro-luminescence) display are available as the display unit 660.

Figure 19:
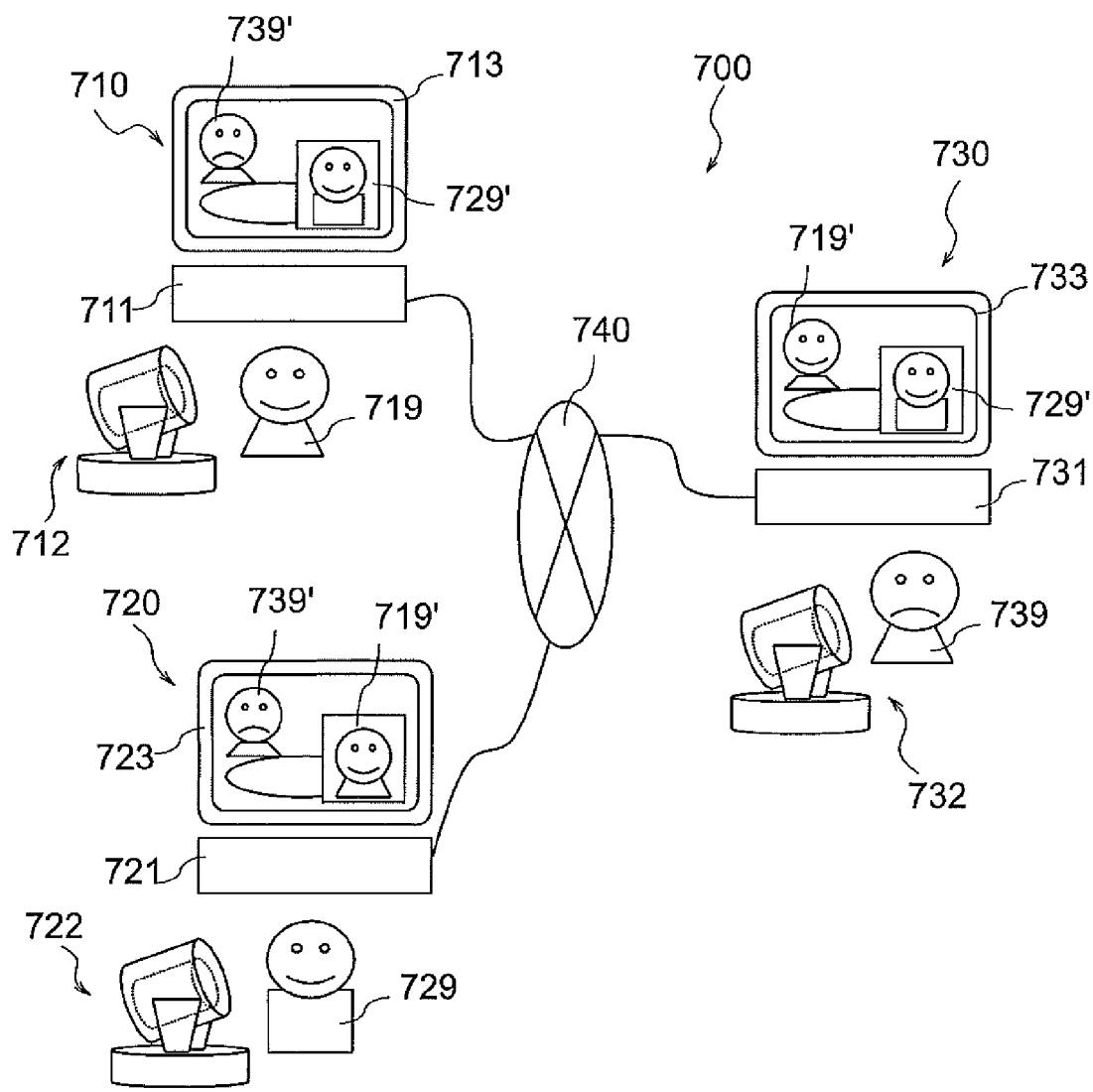
FIG. 19 is a diagram showing an arrangement of a television conference system (image transmission system)

Next, an image transmission system will be described below. FIG. 19 shows an arrangement of a television conference system which is an example of the image transmission system. A television conference system (image transmission system) 700 has a plurality of television conference apparatuses (image transmission apparatuses) 710, 720, and 730. Moreover, each of the image transmission apparatuses 710, 720, and 730 is connected to a network such as a wide area network (WAN) 740.

The television conference apparatus 710 includes a main unit 711, a camera unit 712, and a display unit 713. Similarly, the television conference apparatus 720 includes a main unit 721, a camera unit 722, and a display unit 723, and the television conference apparatus 730 includes a main unit 731, a camera unit 732, and a display unit 733. Description of functions of various units which already has been made by referring to FIG. 18 will be omitted here.

The television conference apparatuses 710, 720, and 730 are disposed at bases (remote places) which are mutually isolated. Therefore, image of each of conference participant 719, 729, 739 is transmitted to a television conference apparatus used by other conference participants, via the wide area network (WAN) 740. As a result, an image 729' and an image 739' of the conference participants 729 and 739 are displayed on the display unit 713. Moreover, an image 719' and the image 739' of the conference participants 719 and 739 are displayed on the display unit 723. Furthermore, the image 719' and the image 729' of the conference participants 719 and 729 are displayed on the display unit 733. An audio is also transmitted together with the transmission of images.

In such manner, by using the television conference system 700, even when the bases are remote places, each of the conference participants 719, 729, and 739 is able to get on with the meeting while watching and listening to other conference participants. A television conference apparatus to be used at each base is not necessarily required to be the same apparatus. The television conference apparatus 710 may be used for at least one television conference apparatus.

Figure 20:
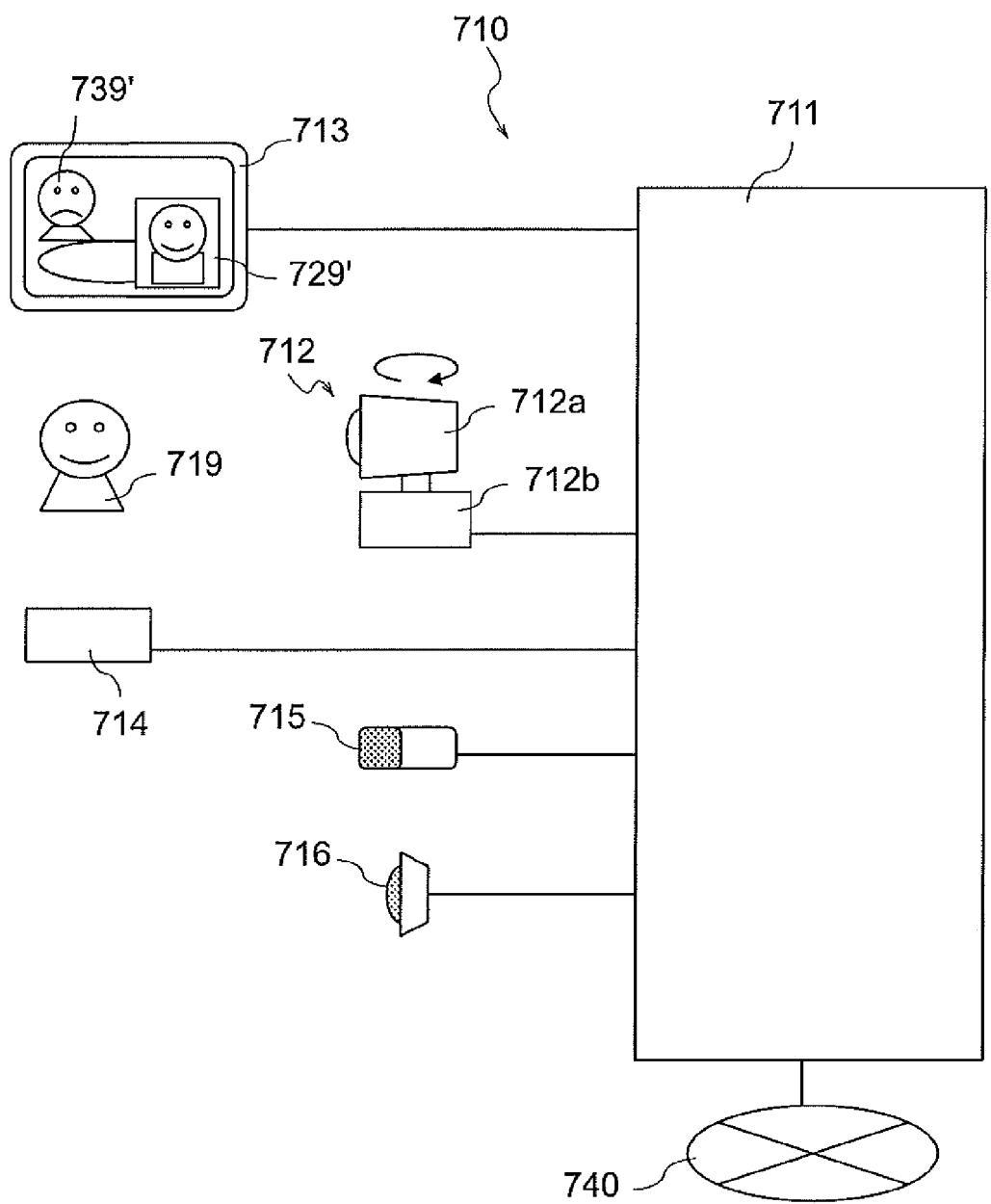
FIG. 20 is a diagram showing details of the television conference apparatus.

A detail arrangement of the television conference apparatus is shown in FIG. 20. In FIG. 20, the description is made by citing an example of the television conference apparatus 710. The television conference apparatus 710 includes the main unit 711, the camera unit 712, the display unit 713, an operation unit 714, a microphone 715, and a speaker 716. Here, the camera unit 712 includes an image pickup apparatus 712a and a driving unit 712b. Moreover, the main unit 711 is connected to the wide area network (WAN) 740.

A function of each unit shown in FIG. 20 being similar as the function described by referring to FIG. 18, the description of such functions will be omitted here. Each of the television conference apparatuses 720 and 730 can be let to have an arrangement similar as in FIG. 20.

Figure 21:
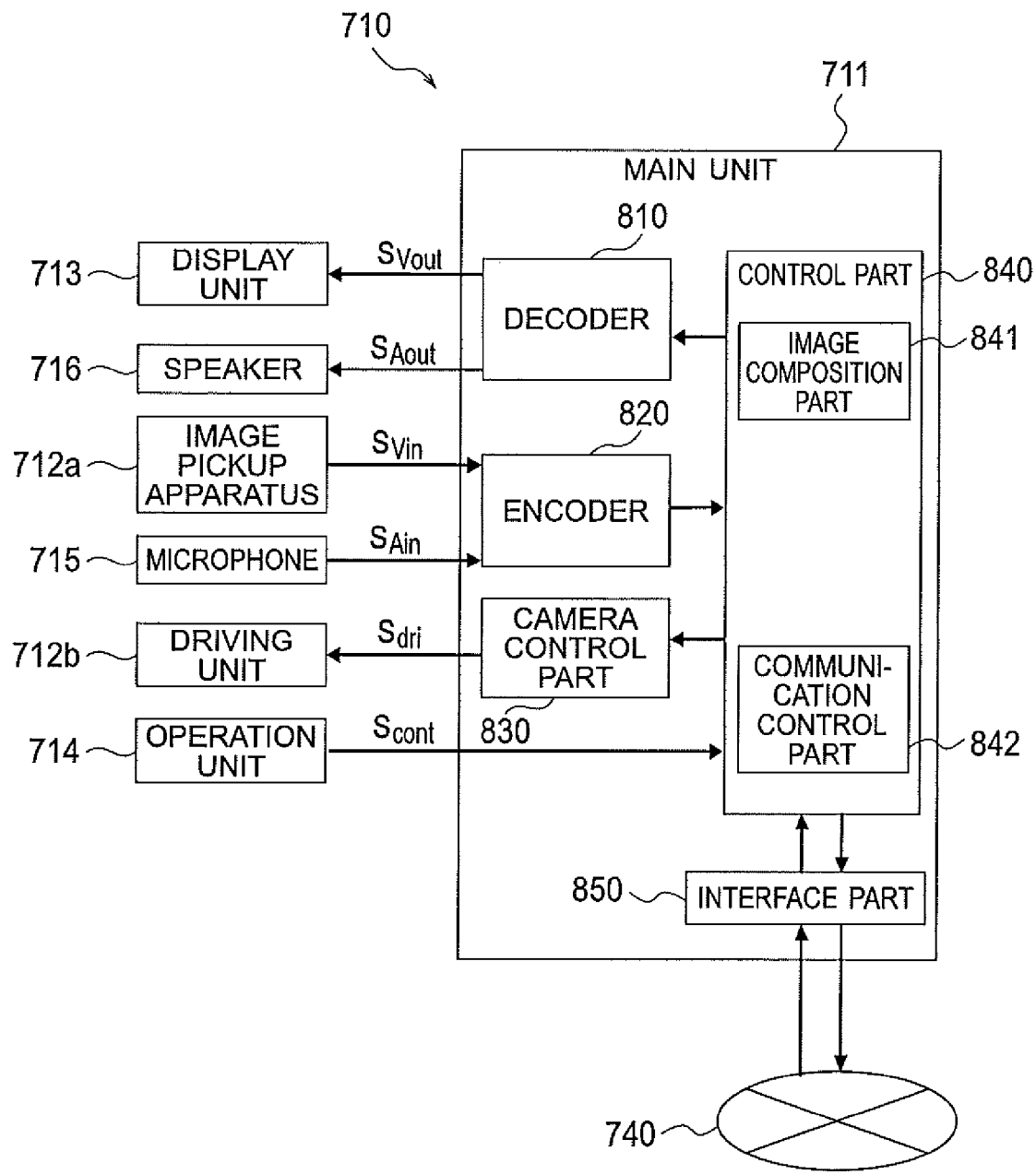
FIG. 21 is a diagram showing a block diagram of the television conference apparatus.

Next, various controls in the television conference apparatus will be described below by using a block diagram in FIG. 21. In FIG. 21, the description is made by citing an example of the television conference apparatus 710. The television conference apparatus 710 includes the main unit 711, the image pickup apparatus 712a, the driving unit 712b, the display unit 713, the operation unit 714, the microphone 715, and the speaker 716.

The main unit 711 is connected to the wide area network (WAN) 740. The main unit 711 includes a decoder 810, an encoder 820, a camera control part 830, a control part 840, and an interface part 850. Moreover, the control part 840 includes an image composition part 841 and a communication control part 842.

The control part 840 includes a CPU (central processing unit), a RAM (random access memory), and a non-volatile memory, apart from the image composition part 841 and the communication control part 842. The control part 840 controls its television conference apparatus according to instructions from those who have attended the conference, which have been input from the operation unit 714. Moreover, the control system 840 controls the entire television conference system in coordination with the other television conference apparatuses.

The image pickup apparatus 712a is an apparatus for receiving an optical image of conference participants, and converting the optical image to an electrical image signal $S_{Vin}$. The image pickup apparatus 712a is connected to the driving unit 712b. The driving unit 712b is a unit for changing a zooming state in the image pickup apparatus 712a (image pickup optical system), and rotating the image pickup apparatus 712a. For carrying out such an operation, a drive signal $S_{dri}$ is output from the camera control part 830 to the driving unit 712b.

The image signal $S_{Vin}$ which has been output from the image pickup unit 712a is input to the encoder 820 via an input section. An audio signal $S_{Ain}$ which has been output from the microphone 715 is also input to the encoder 820. In the encoder 820, a signal is encoded to a form which is appropriate for communication and digital processing. For instance, the image signal $S_{Vin}$ and the audio signal $S_{Ain}$ are converted to a signal format which is appropriate for television conference. The image signal $S_{Vin}$ and the audio signal $S_{Ain}$ which have been converted are input to the control part 840.

The control part 840 outputs the image signal $S_{Vin}$ and the audio signal $S_{Ain}$ to the interface part 850 via the communication control part 842. The image signal $S_{Vin}$ and the audio signal $S_{Ain}$ are transmitted to a television conference apparatus of other conference participant via the interface part 850 and the wide area network (WAN) 740.

Whereas, an image signal $S_{Vout}$ and an audio signal $S_{Aout}$ are input to the interface part 850 from the television conference apparatus of the other conference participant via the wide area network (WAN) 740. Next, the image signal $S_{Vout}$ and the audio signal $S_{Aout}$ are input to the image composition part 841 via the control part 840.

In the image composition part 841, the image signal $S_{Vout}$ and the audio signal $S_{Aout}$ are combined. Accordingly, an image-audio signal for outputting from the display unit 713 and the speaker 716 is formed. Here, the image-audio signal being an encoded signal, the image-audio signal is decoded in the decoder 810. In such manner, the decoder 810 converts the image-audio signal which has been encoded, to an electric signal appropriate for outputting to the display unit 713 and the speaker 716. The image-audio signal which has been converted is output to the display unit 713 and the speaker 716.

The display unit 713 converts the image signal which has been received from the decoder signal 810, to a brightness signal. Accordingly, the conference participant is able to see an image of other conference participants and conference material. Moreover, an audio signal which has been output from the decoder 810 is output through the speaker 716. Accordingly, the participant is able to hear voice of other conference participants.

In the image composition part 841, the image signal $S_{Vin}$ acquired from the image pickup apparatus 712a and the audio signal $S_{Ain}$ acquired from the microphone 715 may be combined. Moreover, a signal which has been combined may be output to the display unit 713 and the speaker 716.

The operation unit 714 is a unit for inputting an identification number. The identification number is et to a television conference apparatus of a communication another conference participant desired by the conference participant. Apart from this, the operation unit 714 is used for connecting to the television conference apparatus of the communication counterpart and to adjust a state of the image pickup apparatus 712a, the driving unit 712b, or the microphone 715. For carrying out such operations, a control signal $S_{cont}$ is to be output from the operation unit 714 to the control part 740.

The present invention can also take various modified embodiment without departing from the scope of the invention.

As it has been described above, the present invention is appropriate to a zoom lens with a high zooming ratio, a wide angle of view, and a small F value at the wide angle end, and in which, various aberrations are corrected favorably, and an image pickup apparatus in which the zoom lens is used, an image transmission apparatus, and an image transmission system.

What is claimed is:

1. A zoom lens comprising in order from an object side:
   a first lens group having a positive refractive power;
   a second lens group having a negative refractive power;
   a third lens group having a negative refractive power;
   a fourth lens group having a positive refractive power;
   a fifth lens group having a positive refractive power; and
   a last lens group having a positive refractive power, wherein
   at the time of zooming from a wide angle end to a telephoto end,
   the second lens group and the third lens group move, and
   one of the fourth lens group, the fifth lens group, and the last lens group moves, wherein the zoom lens satisfies the following conditional expression:

$$0.1 < |\beta 23W| < 0.30,$$

where $\beta 23W$ denotes a combined magnification of the second lens group and the third lens group, at the wide angle end, and is a magnification at the time of infinite object point focusing.

2. The zoom lens according to claim 1, wherein
   at the time of zooming from the wide angle end to the telephoto end,
   the first lens group is fixed,
   the second lens group and the third lens group move together while changing a distance relatively,
   the fourth lens group is fixed,
   the fifth lens group moves, and
   at the time of focusing, the fifth lens group moves.

3. The zoom lens according to claim 1, wherein the distance between the second lens group and the third lens group decreases at the time of zooming from the wide angle end to an intermediate region, and is constant at the time of zooming from the intermediate region to the telephoto end.

4. The zoom lens according to claim 1, wherein the zoom lens satisfies the following conditional expression (1)

$$0.5 < (fg3/fg2) < 1.3 \tag{1}$$

where,
   fg2 denotes an amount of movement of the second lens group from the wide angle end to the telephoto end, and
   fg3 denotes an amount of movement of the third lens group from the wide angle end to the telephoto end.

5. The zoom lens according to claim 1, wherein the zoom lens satisfies the following conditional expressions (2) and (3)

$$0.35 < (\beta 45T/\beta 45W)/(\beta 23T/\beta 23W) < 1.2 \tag{2}$$

$$3.0 < \beta 23T/\beta 23W < fT/fW \tag{3}$$

where,
   $\beta 23W$ denotes a magnification of a combined system of the second lens group and the third lens group, at the wide angle end,
   $\beta 23T$ denotes a magnification of the combined system of the second lens group and the third lens group, at the telephoto end,
   $\beta 45W$ denotes a magnification of a combined system of the fourth lens group and the fifth lens group, at the wide angle end,
   $\beta 45T$ denotes a magnification of the combined system of the fourth lens group and the fifth lens group, at the telephoto end,
   fW denotes a focal length of an overall zoom lens system, at the wide angle end,
   fT denotes a focal length of the overall zoom lens system at the telephoto end,
   where, $$fT/fW > 7, \text{ and}$$

each is a focal length or a magnification at the time of infinite object point focusing.

6. The zoom lens according to claim 1, wherein the zoom lens satisfies the following conditional expression (5)

$$0.7 < |\beta 23T| < 2.0 \tag{5}$$

where,
   $\beta 23T$ denotes a combined magnification of the second lens group and the third lens group, at the telephoto end, and is a magnification at the time of infinite object point focusing.

7. The zoom lens according to claim 1, wherein the zoom lens satisfies the following conditional expression (6)

$$1.0 < f45W/f45T < 2.00 \tag{6}$$

where,
   f45W denotes a focal length of a combined system of the fourth lens group and the fifth lens group, at the wide angle end,
   f45T denotes a focal length of the combined system of the fourth lens group and the fifth lens group, at the telephoto end, and
   each of f45W and f45T is a magnification at the time of infinite object point focusing.

8. The zoom lens according to claim 1, wherein the zoom lens satisfies the following conditional expression (7)

$$0.30 < |\beta 45W| < 0.70 \tag{7}$$

where,
   $\beta 45W$ denotes a magnification of a combined system of the fourth lens group and the fifth lens group, at the wide angle end, and is a magnification at the time of infinite object point focusing.

9. The zoom lens according to claim 1, wherein the zoom lens satisfies the following conditional expression (8)

$$0.90 < |\beta 45T| < 1.80 \tag{8}$$

where,
   $\beta 45T$ denotes a magnification of a combined system of the fourth lens group and the fifth lens group, at the telephoto end, and is a magnification at the time of infinite object point focusing.

10. The zoom lens according to claim 1, wherein a direction of movement of the fifth lens group at the time of zooming is toward the object side all the time.

11. The zoom lens according to claim 1, wherein
the fifth lens group includes in order from the object side, a lens component having a positive refractive power and a lens component having a negative refractive power, and
the lens component is one of a single lens and a cemented lens, and has two optical surfaces which are in contact with air.

12. The zoom lens according to claim 1, wherein the zoom lens satisfies the following condition expression (9)

$$-0.3 < (R52F-R52R)/(R52F+R52R) < 0.6 \tag{9}$$

where,
R52F denotes a paraxial radius of curvature of a surface nearest to the object side of a lens component having a negative refractive power in the fifth lens group, and
R52R denotes a paraxial radius of curvature of a surface nearest to an image side of a lens component having a negative refractive power in the fifth lens group.

13. The zoom lens according to claim 1, wherein
a lens component having a negative refractive power in the fifth lens group is a cemented lens, and
the cemented lens includes in order from the object side, a single lens having a positive refractive power and a single lens having a negative refractive power, and
the zoom lens satisfies the following conditional expression (10)

$$-0.5 < (R522F+R522R)/(R522F-R522R) < 1.2 \tag{10}$$

where,
R522F denotes a paraxial radius of curvature of a surface on the object side of the single lens having a negative refractive power in the fifth lens group, and
R522R denotes a paraxial radius of curvature of a surface on an image of the single lens having a negative refractive power in the fifth lens group.

14. The zoom lens according to claim 1, wherein
the fourth lens group includes in order from the object side a single lens having a positive refractive power and a lens component having a negative refractive power.

15. The zoom lens according to claim 1, wherein the zoom lens satisfies the following conditional expression (11)

$$0.1 < (R42F-R42R)/(R42F+R42R) < 5.0 \tag{11}$$

where,
R42F denotes a paraxial radius of curvature of a surface nearest to the object side of the lens component having a negative refractive power in the fourth lens group, and
R42R denotes a paraxial radius of curvature of a surface nearest to an image side of the lens component having a negative refractive power in the fourth lens group.

16. The zoom lens according to claim 1, wherein
the last lens group includes a single lens having a positive refractive power.

17. The zoom lens according to claim 1, wherein the zoom lens satisfies the following conditional expression (12)

$$0.70 < |\beta FW| < 0.98 \tag{12}$$

where,
βFW denotes a magnification of the last lens, at the wide angle end, and is a magnification at the time of infinite object point focusing.

18. The zoom lens according to claim 1, wherein the zoom lens satisfies the following conditional expression (13)

$$0.4 < f5/fF < 1.2 \tag{13}$$

where,
f5 denotes a focal length of the fifth lens group, and
fF denotes a focal length of the last lens group.

19. The zoom lens according to claim 1, wherein the zoom lens satisfies the following conditional expression (14)

$$0.40 < f5/f4 < 1.00 \tag{14}$$

where,
f4 denotes a focal length of the fourth lens group, and
f5 denotes a focal length of the fifth lens group.

20. The zoom lens according to claim 1, wherein the zoom lens satisfies the following conditional expression (15)

$$4.0 < f5/fW < 10.0 \tag{15}$$

where,
f5 denotes a focal length of the fifth lens group, and
fW denotes a focal length of the overall zoom lens, at the wide angle end, and is a focal length at the time of infinite object point focusing.

21. The zoom lens according to claim 1, wherein the zoom lens satisfies the following conditional expression (16)

$$-2.00 < ff5/f5 < -1.00 \tag{16}$$

where,
f5 denotes a focal length of the fifth lens group, and
ff5 denotes a distance from an apex (vertex) of a surface nearest to the object side of the fifth lens group up to a front-side focal point of the fifth lens group.

22. The zoom lens according to claim 1, wherein the zoom lens satisfies the following conditional expression (17)

$$0.50 < fb4/f4 < 1.5 \tag{17}$$

where,
f4 denotes a focal length of the fourth lens group, and
fb4 is a distance from an apex of a surface nearest to the object side of the fourth lens group up to a rear-side focal point of the fourth lens group.

23. The zoom lens according to claim 1, wherein the zoom lens satisfies the following conditional expression (18)

$$9 < f1/fW < 18 \tag{18}$$

where,
f1 denotes a focal length of the first lens group, and
fW denotes a focal length of the overall zoom lens, at the wide angle end, and is a focal length at the time of infinite object point focusing.

24. The zoom lens according to claim 1, wherein the zoom lens satisfies the following conditional expression (19)

$$-0.5 < fW/f1234T < 0.10 \tag{19}$$

where,
fW denotes a focal length of the overall zoom lens at the wide angle end, and
f1234T denotes a focal length of a combined system from the first lens group up to the fourth lens group, at the telephoto end, and
each of fW and f1234T is a focal length at the time of infinite object point focusing.

25. An image pickup apparatus comprising:
a zoom lens according to claim 1; and
an image pickup element which is disposed on an image plane of the zoom lens.

26. An image transmission apparatus comprising:
a camera unit which includes an image pickup apparatus according to claim 25;
a main unit which carries out signal processing of an image which has been acquired by the image pickup apparatus; and
a transmission section which transmits an image which has been subjected to processing by the main unit.

27. The image transmission apparatus according to claim 26, further comprising:
an audio unit which acquires an audio, wherein
the main unit carries out signal processing of the audio which has been acquired by the audio unit, and
the audio which has been subjected to processing by the main unit is transmitted by the transmission section.

28. The image transmission apparatus according to claim 26, further comprising:
a display unit which displays an image, wherein
the display unit is capable of displaying an image which has been received via a network.

29. An image transmission system comprising:
an image transmission apparatus according to claim 26, wherein
the image transmission apparatus is connected to a network, and
the image transmission apparatus transmits an image which has been acquired at least by the image pickup apparatus, between bases which are placed remotely physically.

* * * * *

UNITED STATES PATENT AND TRADEMARK OFFICE
CERTIFICATE OF CORRECTION

PATENT NO. : 8,941,926 B2  
APPLICATION NO. : 13/627275  
DATED : January 27, 2015  
INVENTOR(S) : Mihara et al.

Page 1 of 1

It is certified that error appears in the above-identified patent and that said Letters Patent is hereby corrected as shown below:

In the Specification at column 14, line 5, change "|β$FW$" to "|β$FW$|"; and  
at column 24, line 22, change "/" to "]".

In the Claims at column 42, in claim 21, at line 31, delete "(vertex)".

Signed and Sealed this  
Thirtieth Day of June, 2015

Michelle K. Lee  
*Director of the United States Patent and Trademark Office*